United States Patent [19]

Cameron et al.

[11] 4,279,013
[45] Jul. 14, 1981

[54] MACHINE PROCESS CONTROLLER

[75] Inventors: Larry E. Cameron, Sterling Heights; Kenneth J. Cook, Troy; Vance E. Neff, Detroit; Keith L. Rowland, Pontiac, all of Mich.

[73] Assignee: The Valeron Corporation, Troy, Mich.

[21] Appl. No.: 89,436

[22] Filed: Oct. 31, 1979

[51] Int. Cl.³ .................. G05B 13/02; G05B 23/02
[52] U.S. Cl. ............................ 364/105; 318/561; 318/571; 364/119; 364/474; 364/511
[58] Field of Search ............... 364/474, 475, 105, 119, 364/506, 511, 483, 550; 318/571, 563, 565, 650, 561, 39; 409/145, 148, 150, 151, 153, 154, 156, 80; 408/9, 10, 11, 12, 13, 16; 324/142; 73/104, 105, 117, 117.3, 117.4, 116

[56] References Cited

U.S. PATENT DOCUMENTS

| | | |
|---|---|---|
| 3,573,588 | 4/1971 | Geyer et al. .......................... 318/571 |
| 3,665,493 | 5/1972 | Glowzewski et al. .......... 318/571 X |
| 3,715,938 | 2/1973 | Ledergerber et al. .......... 318/571 X |
| 3,834,615 | 9/1974 | Watanabe et al. ................... 318/565 |
| 3,849,712 | 11/1974 | Lankford et al. ............. 318/571 X |
| 3,896,360 | 7/1975 | Meyer et al. ......................... 318/571 |
| 4,031,368 | 6/1977 | Colding et al. ...................... 364/105 |
| 4,136,302 | 1/1979 | Tlaker et al. .................. 318/571 X |
| 4,150,327 | 4/1979 | Camera et al. ................. 318/571 X |
| 4,208,718 | 6/1980 | Chung ................................. 364/474 |

Primary Examiner—Joseph F. Ruggiero
Attorney, Agent, or Firm—Krass, Young & Schivley

[57] ABSTRACT

The controller includes a power sensing device which monitors the instantaneous power drawn by the machine and compares it with a predetermined limit level of desired power consumption. A user programmable timer is manually accessible for loading a selected time delay period therein. The controller provides an output capable of altering the machine operation when the machine power consumption has continuously exceeded the limit value for the selected time period. The controller outputs may be latched or nonlatched once an overlimit condition is detected in accordance with a user selectable programmed parameter. In an adaptive mode, the controller forces the feed rate to a programmable feed rate for a selected period of time upon initial impact between the workpiece and the machine tool. The controller then maintains a normal adaptive power level in which the feed rate response may be selectively altered as a percentage of an exponential function of the difference between the actual machine power consumption and the programmable desired adaptive power level. Provision is made for automatically referencing the feed rate control signal to the voltage rating of the feed rate drive motor in the machine.

58 Claims, 26 Drawing Figures

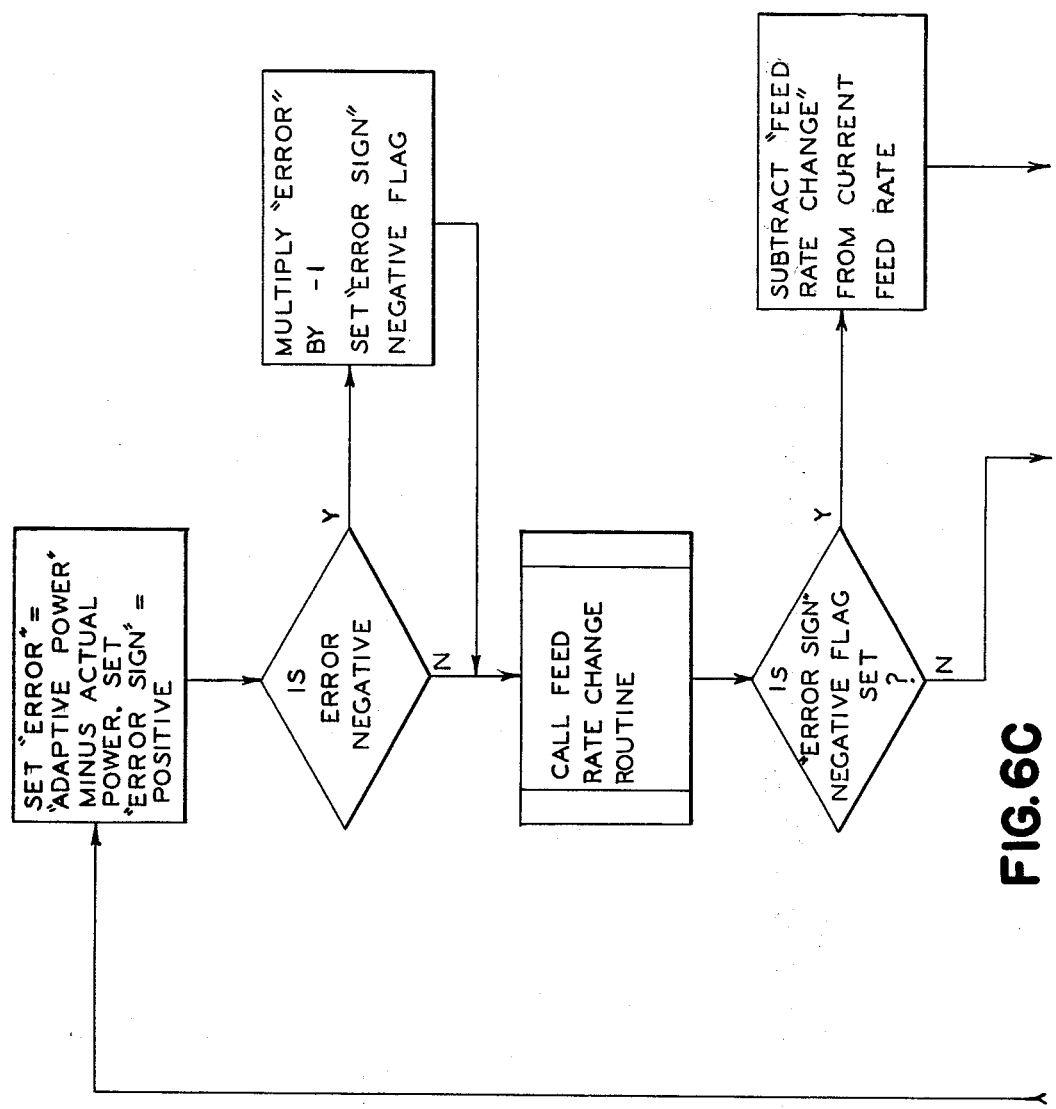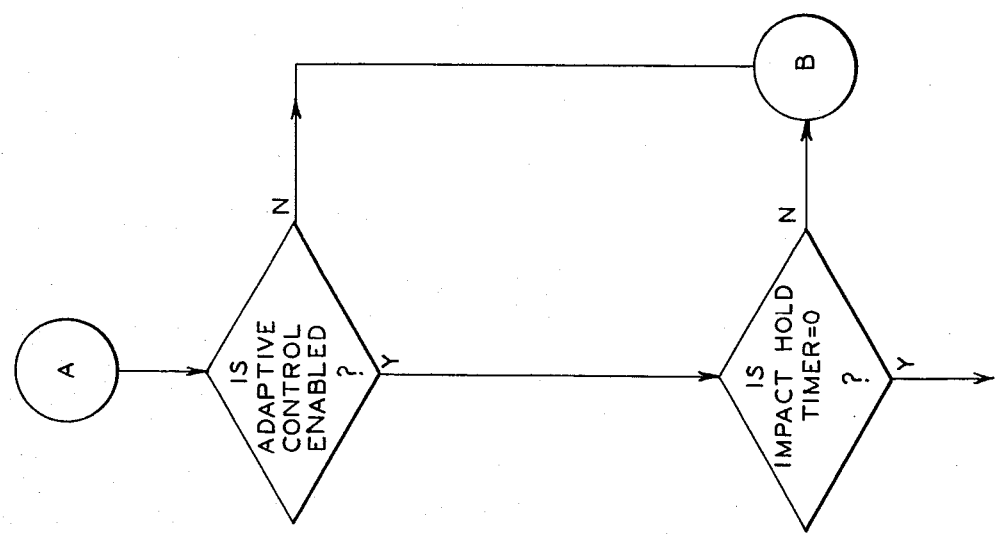
FIG.6C

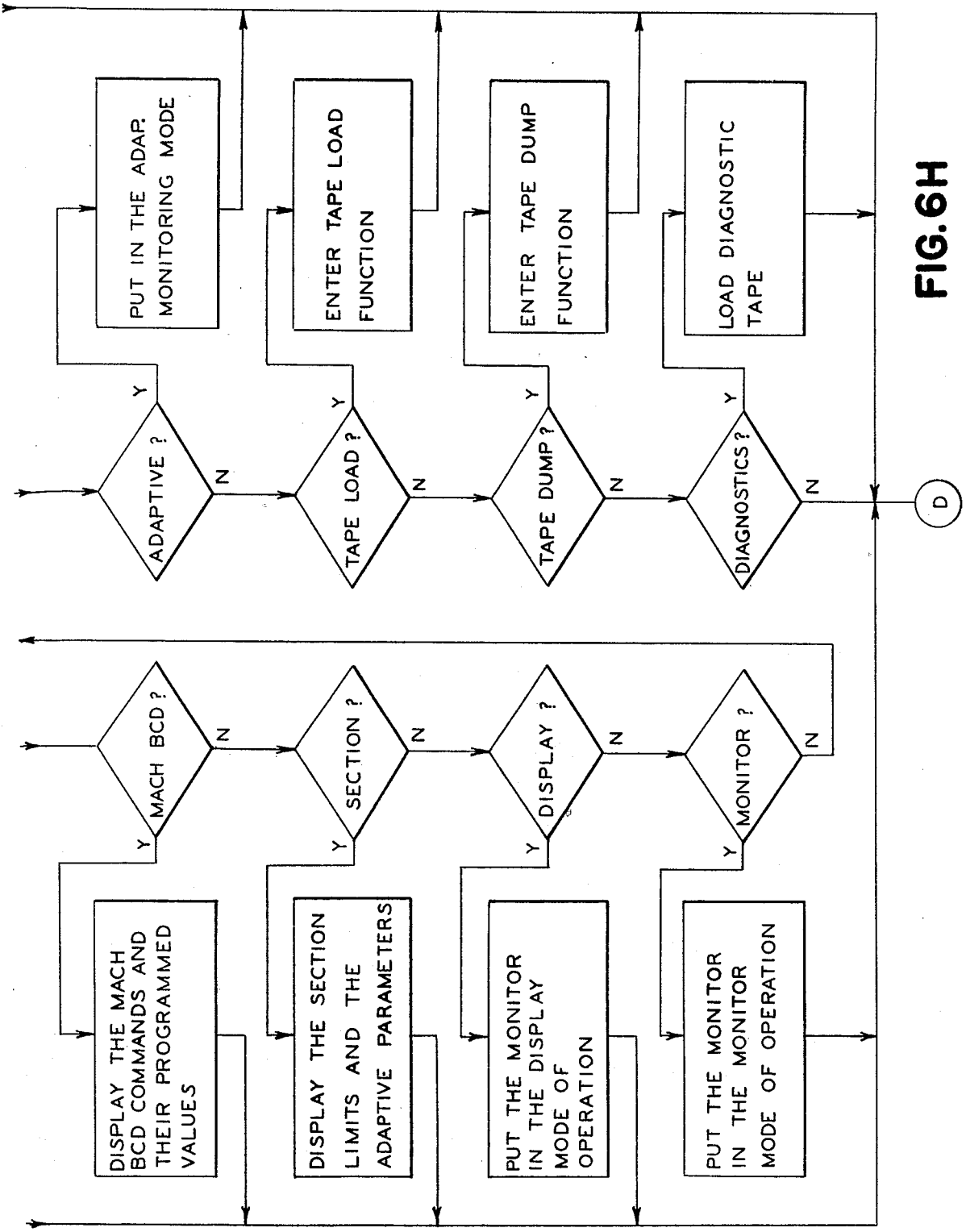

```
MACHINE 01    PARAMETERS      00000

MACHINE HI LIMIT           18.00
  >MACHINE LO LIMIT           02.00
   OVER LIMIT TIME DELAY      01.5
   SPINDLE SURGE TIME         03.5
```

MACHINE PROGRAMMABLE PARAMETERS

FIG. 7A

```
MACHINE 01    SECTION 11      00000
                   BCD          31
  LIMIT 1    18.75    DELAY 1  01.0
  LIMIT 2    16.50    DELAY 2  00.2
  ADPT. PWR. 11.00    RESPONSE  50
  IDLE PWR.  01.50 > AIR CUT   85%
  IMPACT       20%    HOLD     00.2
  MINIMUM      05%    MAXIMUM 100%
```

SECTION PROGRAMMABLE PARAMETERS

FIG. 7B

```
MACHINE 01  BCD COMMANDS    00000
   MACH LO LIMIT  ON 11    OFF  12
   LIMIT 1 LATCH     13    NON  14
  >LIMIT 2 LATCH     15    NON  16
   TIMER          ON 17    OFF  18
   COUNT             19    A/Z  20
   RESET             21    NULL 22
   ADAPTIVE       ON 23    OFF  24
```

BCD CONTROLLED PROGRAMMABLE PARAMETERS

FIG. 7C

| | 0 | 1 | 2 | 3 | 4 | 5 | 6 | 7 |
|---|---|---|---|---|---|---|---|---|
| 1 | BCD L/NL #1 | BCD L/NL #2 | X | L/NL #2 | L/NL #1 | | TIMER DISPLAY | ADT ON/OFF |
| | 0 | 1 | 2 | 3 | 4 | 5 | 6 | 7 |
|---|---|---|---|---|---|---|---|---|
| 2 | MCH HI LMT | MCH LOW LMT ON/OFF | BCD LOW LMT ON/OFF | X | X | X | X | X |
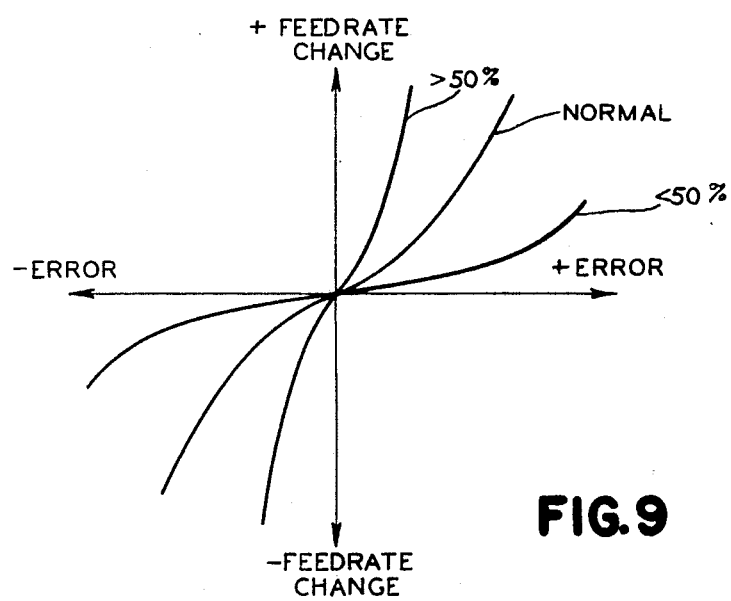
FIG. 8
FIG. 9
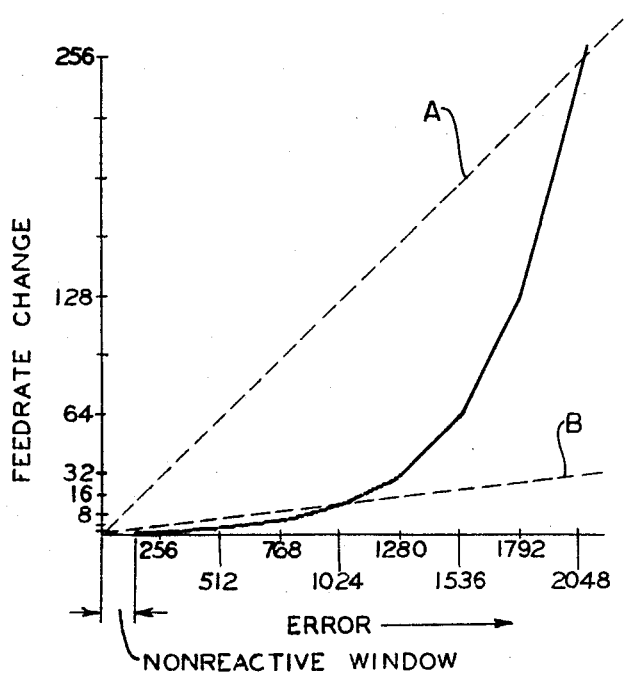
FIG. 10

MACHINE PROCESS CONTROLLER

BACKGROUND OF THE INVENTION

This invention relates to machine controllers and, in particular, to controllers which utilize machine power consumption as a criterion for monitoring proper operation.

The need to automatically control machining operations has long been apparent to the industry. The demand for intricate designs to be formed in the workpiece and human limitations, as well as the limitations of the machinery have led to the ever increasing usage of automatic machine controllers to optimize the speed of the machining operation while at the same time preventing damage to the machine components. The earliest attempts in the art were relatively simple approaches in which a certain criterion was monitored and the machine shut off when a limit for the criterion was exceeded. However, as the years went by, the machine controllers became more and more complicated and expensive under the guise of being more sophisticated. In fact, in some of the most recent machine controllers at least nine different machine parameters are continuously monitored by exotic sensing devices and utilized to adaptively control machine cutting operations as a complex function of all the various criteria. (See e.g., U.S. Pat. No. 4,031,368 to Colding et al).

In addition to the increasing complexity of the art, known machine controllers have other perplexing problems. In general, the prior art systems immediately respond to an overlimit condition to alter the machine operation. Unfortunately, the overlimit conditions may not always be due to improper machine operation. This is especially true during machine start up, during diverse machining operations on workpieces which may have non-homogeneous structures, when the machine is being operated in an electrically noisy environment, etc. The prior art controllers generally will automatically shut off the machine in the event of these pseudo alarm conditions. This requires the operator to check the machine for damage, readjust the workpiece location, if necessary, and then restart the machining operation. In high volume production, this unnecessary down time becomes extremely expensive and results from the inability to discriminate between actual alarm conditions which would damage the machine and those conditions which similarly affect the monitored criteria but do not result in damage. The servosystems of the prior art controllers are also susceptible to non-stable operation. In the adaptive control mode, the feed rate change value is generated linearly by the system and may cause such a dramatic variation in the status quo that the machine will overshoot the desired level. Subsequently, the system will generate a change in the opposite direction to compensate for its overshot condition. This "ringing" can continue ad infinitum. Of course, these oscillations deleteriously affect the machining operation. Some attempts have been made to correct this problem by damping the linear response. However, machine response will be damped by the same factor at high error levels as at the more critical lower levels thereby preventing the machine operation to be quickly brought into conformity with the desired operating level when there is a large amount of error. Moreover, none of the prior art systems possess the capability of selectively adjusting the machine response characteristics in order to accomodate for different user applications and environments.

A common problem with known controllers is that they are particularly adapted to only one type of machine and do not possess the flexibility necessary for use in a wide variety of different machining applications. Accordingly, in a large plant, the user must be trained to operate many different types of controllers. This not only is time-consuming and inefficient but often it leads to tool damage from improper operation until the operator becomes familiar with the peculiarities of the controller. Therefore, there has been a substantial need for a universal machine controller which can be readily adapted to a wide variety of different applications and preferably one which is capable of controlling several different types of machining operations simultaneously.

SUMMARY OF THE INVENTION

According to one aspect of the preferred embodiment of this invention, the controller digresses from the trend of the increasing complexity of the prior art devices by utilizing a single criterion on which to base its control functions. What at first blush may seem to be an overly simplistic approach, actually provides surprisingly sufficient criterion for efficiently and accurately controlling machine operation.

The present invention teaches the use of sensing means for monitoring the power used by the machine as the control criterion. Limit setting means supplies a limit value for the controller to define an extreme level of desired power consumption for the machine. A comparator compares the outputs of the sensing means and the limit setting means and is operative to provide an output signal if the machine power consumption has exceeded the limit value. In order to accomodate for expected, but undamaging, power fluctuations peculiar to the particular machine operation, the controller includes a programmable timer which is manually accessible by the operator for loading the timer with a selected time period. The machine operation is not altered unless the machine power consumption has continuously passed the limit value for the selected time period.

The preferred embodiment of the invention utilizes a microprocessor and associated memory to implement the control functions. Preferably, the memory includes selected locations for storing different count signals which define the programmable time delay for various overlimit conditions. One of the overlimit conditions is the generally experienced surge of power at machine start up. The surge time delay stored in the memory serves to disable the comparator until the selected time period has elapsed after machine start up. Various other programmable time delays are taught by the present invention including those which are governing when the machine power consumption has exceeded a programmable high limit or fallen below a programmable low limit of power consumption.

In accordance with a further aspect of this invention, the controller includes at least one dedicated output line which is coupled to the machine. The output line is generally used to alter the machine operation by connecting it to a switch which will be opened or closed depending on the state of the output line. In the event of an overlimit condition, the state of the output line is switched. The user may, by appropriate program commands, cause the state of the output line to be latched at the switched state regardless of whether the machine operation again becomes within limits or, alternatively, to return back to its original state as soon as the machine again falls within the limit constraints.

This invention also teaches a unique method of adaptively controlling an automated machine to effect extraordinarily stable machining operations. Two different feed rates are stored in the memory for determining the relative feed rate between the workpiece and the machine tool: (1) an air cut feed rate when the machine tool is not in contact with the workpiece, and (2) an impact feed rate when the tool initially impacts the workpiece. During operations, the power consumed by the machine is continuously compared with a preselected limit value, preferably selected as a level just above the machine power consumption when idling. The machine feed rate is set at the air cut feed rate until the machine power consumption exceeds the limit value. The feed rate is then shifted to the impact feed rate for a predetermined, user programmable, amount of time to stabilize machine operation once the power consumption exceeds the limit value. After the predetermined time period has elapsed, the feed rate is continuously controlled to maintain a programmable adaptive power level.

Once the feed rate has initially entered the normal adaptive feed rate mode, the difference between the actual power consumed by the machine and the programmable adaptive power level is continuously monitored. The controller generates a new adjusted feed rate level until the actual power consumption is substantially equivalent to the desired adaptive power level. A feed rate change value is generated by the controller and added or subtracted to the old feed rate depending on whether the actual power consumption is below or above the desired level.

According to still another feature of this invention the feed rate change value varies exponentially with the error differential between the actual machine power consumption and the desired adaptive power level. Since the feed rate change level is substantially greater at high error levels, the machine operation quickly responds to a large differential. On the other hand, the feed rate change level is several magnitudes smaller at lesser error levels to thereby gradually converge on the desired adaptive power level. In such manner, system stabilization is provided by preventing oscillations common to prior art devices. Provision is made for an adjustable nonreactive window which, preferably, is a function of the adaptive power level wherein no further feed rate adjustment is made.

Still another aspect of this invention includes the provision of an operator adjustable means for adjusting the feed rate change response as a percentage thereof. Therefore, the response time in arriving at the desired adaptive power level may be increased or decreased depending upon user application.

BRIEF DESCRIPTION OF THE DRAWINGS

These and other advantages of the present invention will become apparent upon reading the following specification and by reference to the drawings in which:

FIG. 7 (A-C) illustrates programmable parameters which are displayed on a screen for operator selection;

FIG. 8 is a view illustrating the bit location in two digital words representing flags indicating selection of particular operator selected parameters;

FIG. 9 is a graph illustrating several feed rate response curves which may be selected by the machine operator; and FIG. 10 is a graph of one quadrant of a feed rate response curve generated according to this invention.

DESCRIPTION OF THE PREFERRED EMBODIMENT

Figure 1:
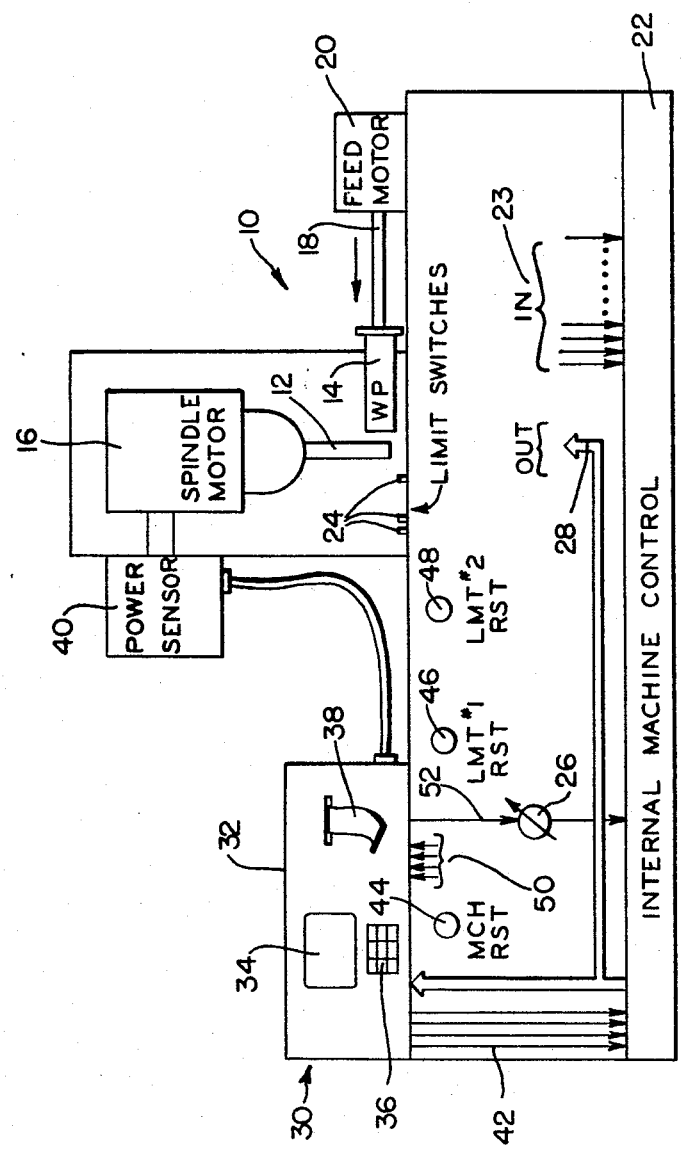
FIG. 1 is an elevation view showing a simplified representation of the machine controller of the present invention in cooperation with a machine tool.

Referring to FIG. 1, there is shown in simplified form a machine 10 having a tool 12 for cutting workpiece 14. Tool 12 is driven by a spindle motor 16 and the workpiece is fed into the path of tool 12 by a piston 18 at a feed rate determined by control signals driving motor 20.

It should be understood that machine 10 may also be capable of moving tool 12 as well, and for purposes of this invention the term feed rate means the relative feed rate between the tool and the workpiece.

The present invention finds particular utility in conjunction with automated machinery which includes an internal machine control circuitry 22 such as known numeric controllers (NC) or computerized numeric controllers (CNC). Control circuitry 22 senses the operational status of the machine over input lines 23 connected, for example, to limit switches 24 and generates output signals for controlling machine operation in response thereto. Of special interest is the control function applied to feed rate motor 20 which determines the feed rate of workpiece 14. A feed rate override potentiometer 26 is generally provided to give the operator some manual control for adjusting the feed rate. Typically, machine control circuitry 22 includes a binary coded decimal (BCD) output command bus 28 which is coupled to the machine components for controlling their operation.

The process controller 30 of the present invention can be utilized to monitor and control the operation of several different machines. However, for ease in readily appreciating the teachings of this invention, its use will be described only in connection with a single machine. Controller 30 is conveniently packaged in a housing 32 which includes a video screen 34, keyboard 36 and printer 38. A power sensor 40 monitors the instantaneous power drawn by spindle motor 16 and provides an indication of such power usage to controller 30. Power sensor 40 may be that manufactured by the assignee of the present invention under the trademark ISO-WATT which is more fully described in U.S. Pat. No. 4,096,436 to Cook et al issued on June 20, 1979. As will be more fully herein described, controller 30 continuously monitors the power consumption of machine 10 and provides control signals to machine control circuitry 22 over output lines 42 when the actual machine power consumption deviates from an optimum level. Controller 30 also communicates directly with machine reset push buttons 44, 46, 48 over input lines 50. Input lines 50 include a STROBE input for entering BCD commands into controller 30 whereas output lines 42 include an ACK output for acknowledging receipt of the commands. Controller 30 interfaces directly with the feed rate override potentiometer 26 over output line 52 for controlling the feed rate in the adaptive mode.

Figure 2A:
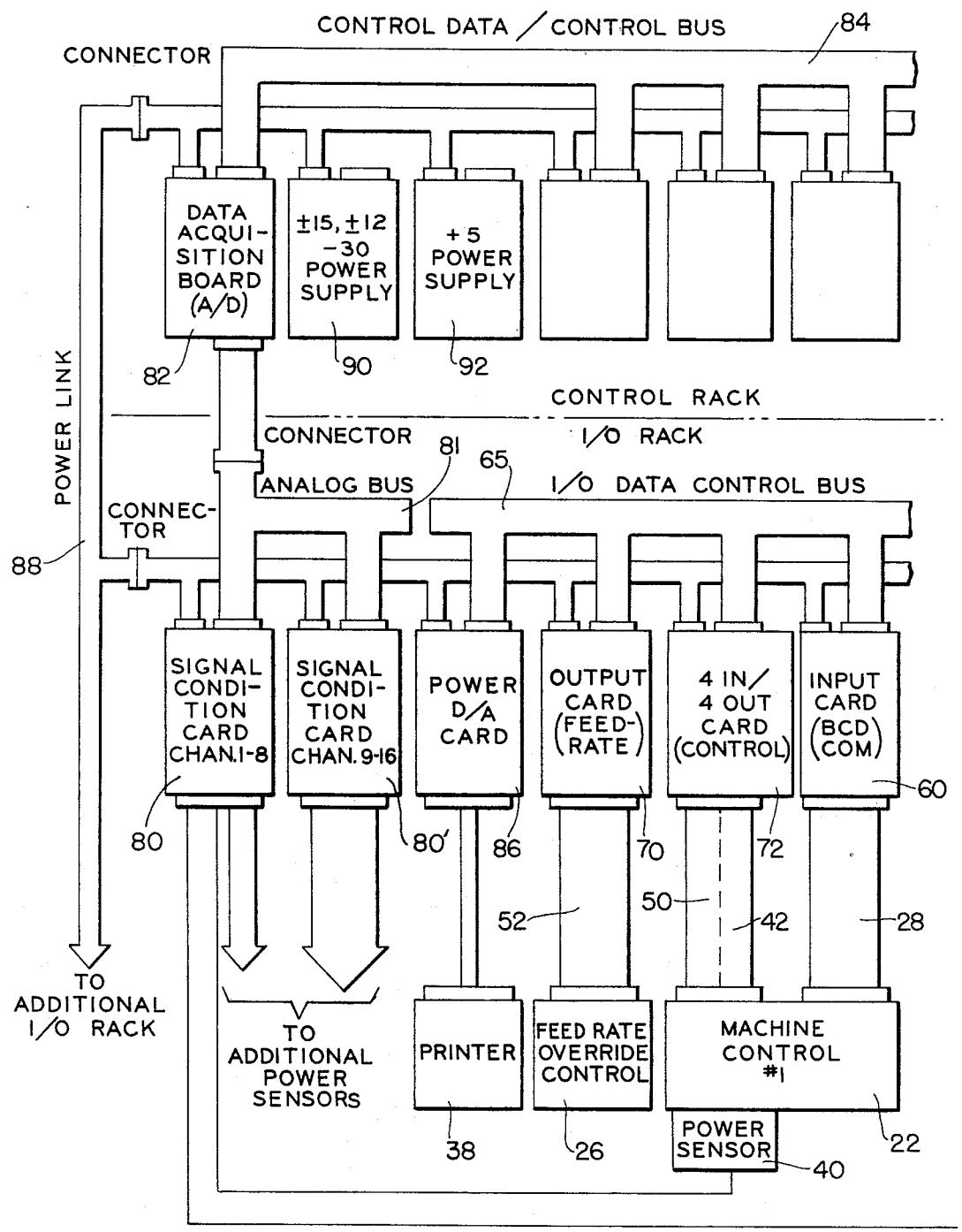
FIG. 2 (A-B) is a block diagram showing the circuit board interconnection structure of the preferred embodiment.
Figure 2B:
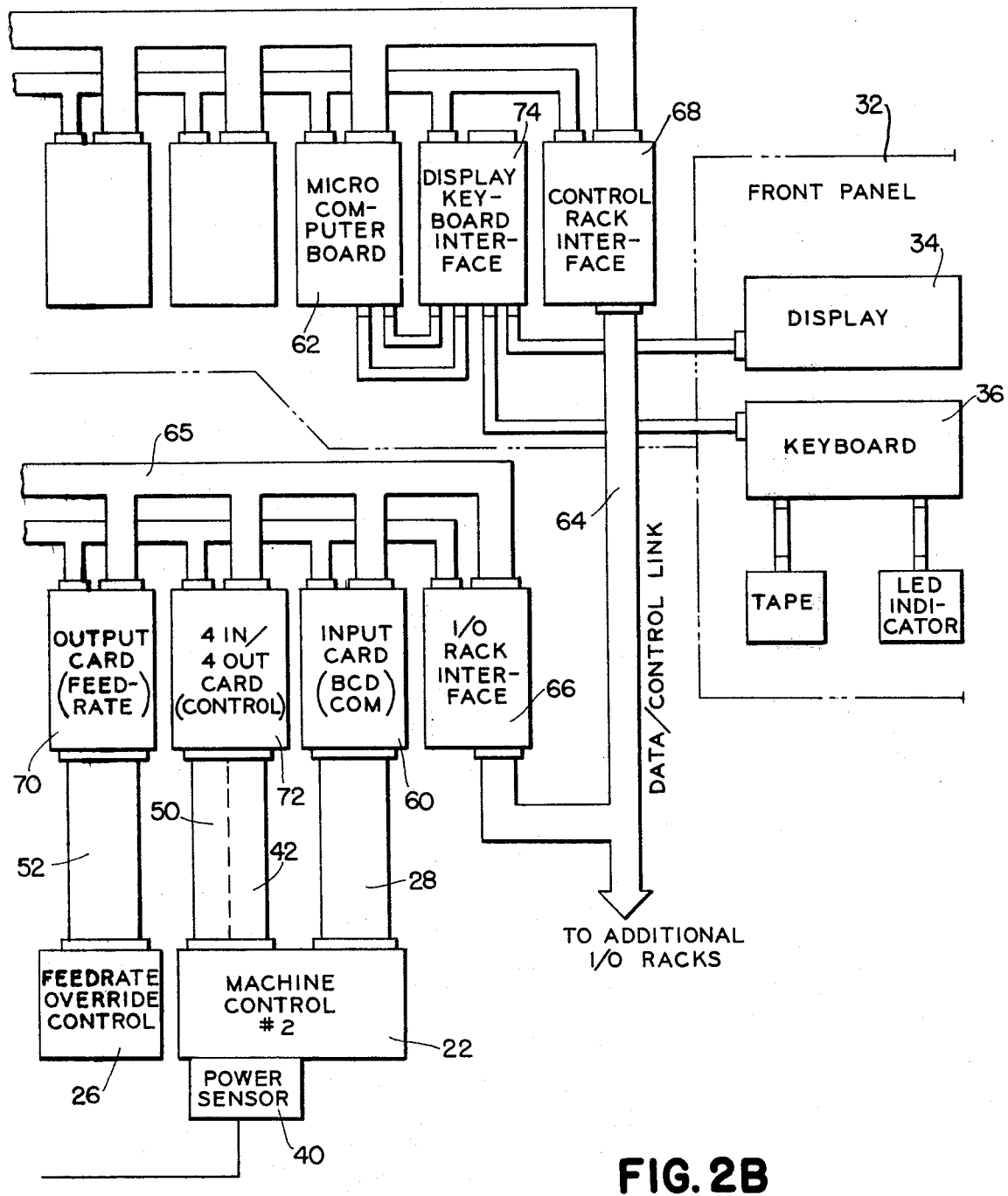

FIG. 2 shows the schematic layout of the circuit portions for the controller 30, with the rectangular boxes representing individual circuit board cards within housing 32. The particular embodiment shown includes two racks within housing 32, a control rack and an I/O rack which accomodates inputs from two separate machines. More machines can be monitored merely by adding similar I/O racks. Briefly, the BCD commands from machine control circuitry 22 are received and temporarily stored in the buffer logic of input card 60. The BCD commands communicate with microcomputer board 62 over bus 65, through data/control link 64 and bus 84, in cooperation with I/O and control rack interfaces 66 and 68, respectively. The feed rate card 70, I/O card 72 (interfacing input lines 50 as well as output lines 42) likewise communicate with microcomputer 62. A display keyboard interface 74 couples display 34 and keyboard 36 to microcomputer 62. Power sensor 40 provides informational input to microcomputer 62 by way of a signal conditioning card 80, analog bus 81, and an analog to digital converter card 82 whose output is fed over bus 84 to microcomputer 62. Optional printer 38 is controlled via digital to analog circuitry on card 86. Power is provided to the individual cards by way of link 88. Cards 90 and 92 provide appropriate biasing voltages to the internal electrical components of the other cards.

Figure 3:
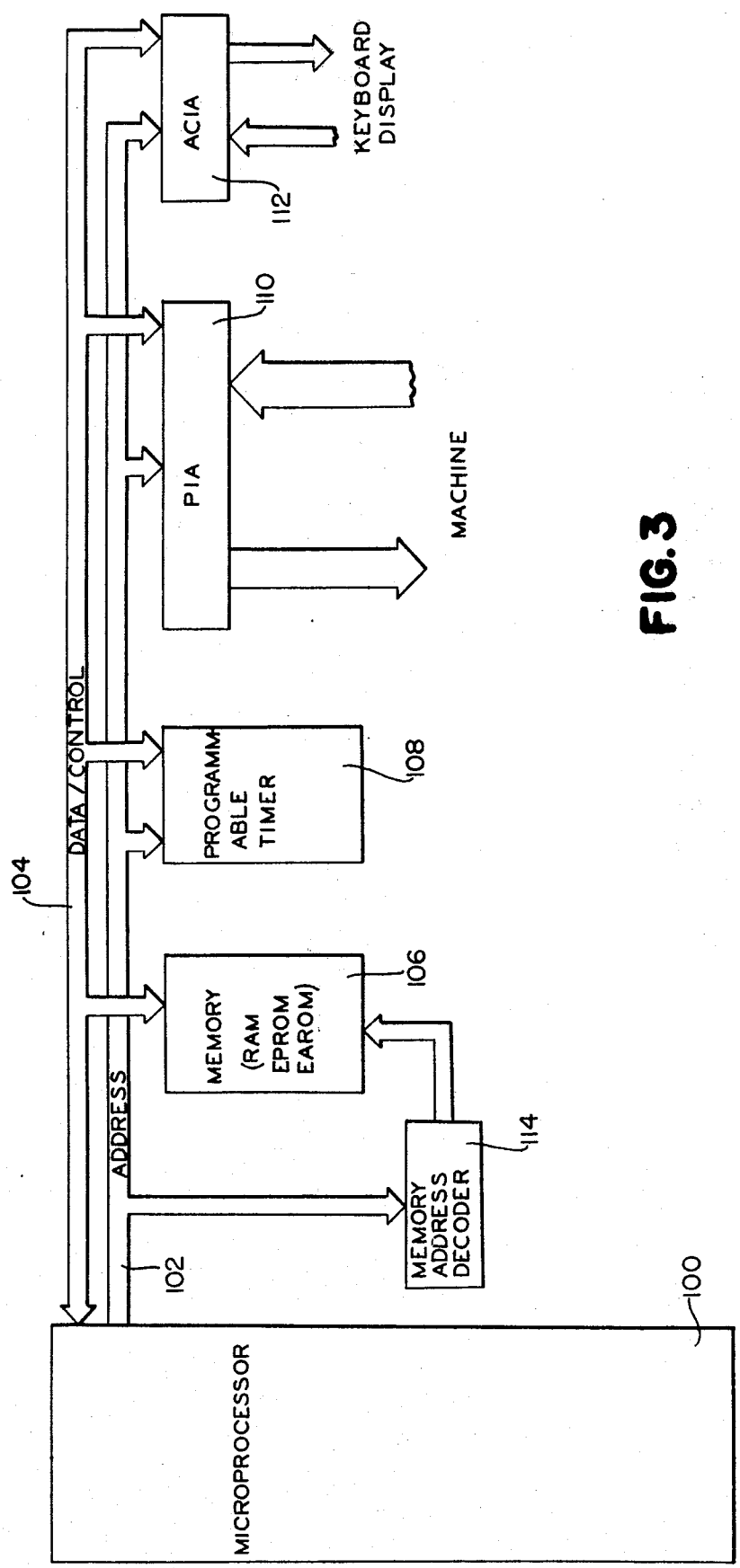
FIG. 3 is a schematic block diagram of the microcomputer utilized in the preferred embodiment.

FIG. 3 shows in somewhat more detail the configuration of microcomputer board 62. A microprocessor unit 100 communicates over address bus 102 and data/control bus 104 with a memory module 106, a programmable timer 108, a peripheral interface adapter (PIA) 110 and an asynchronous communication interface adapter (ACIA) 112. Memory module 106 preferably includes a random access (RAM) memory, an erasable programmable read only memory (EPROM), and an electrically alterable memory (EAROM) which are individually addressed by memory address decoder 114. The functional block diagram of FIG. 3 is representative of a conventional integrated circuit microcomputer complex. In this particular example, microprocessor 100 is a Motorola MC6802 microprocessor, memory module 106 includes a 2716 EPROM, a 2114 RAM, and a 3400 EAROM, all of which are known in the art. Programmable timer 108 is a 6840 component, PIA 100 is a 6820 component, and ACIA 112 is preferably a Motorola 6850 device. The ACIA 112 provides an interface for receiving serial data from the keyboard interface 74 and presenting it over data/control bus 104 in a parallel fashion compatible with microprocessor 100. ACIA 112 likewise converts the data from microprocessor 100 into a format compatible with the keyboard 36 and display 34. PIA 100 generally provides a buffer interface for temporarily storing inputs from the machine for subsequent transmittal to microprocessor 100 and, conversely, storing data placed therein from microprocessor 100 for transmittal to the machine. The program which will be later described in detail is stored in memory module 106 and is used to instruct the operation of the microprocessor 100. The program includes certain routines which must be initiated within a given time frame. To this end, programmable timer 108 is loaded with a predetermined binary number. During operation, programmable timer 108 is decremented until it counts down to 0 from the number previously loaded into it. When timer 108 times out it sets a flag. The program is structured to check for the status of this flag and when it is set the program performs certain designated tasks.

Figure 4A:
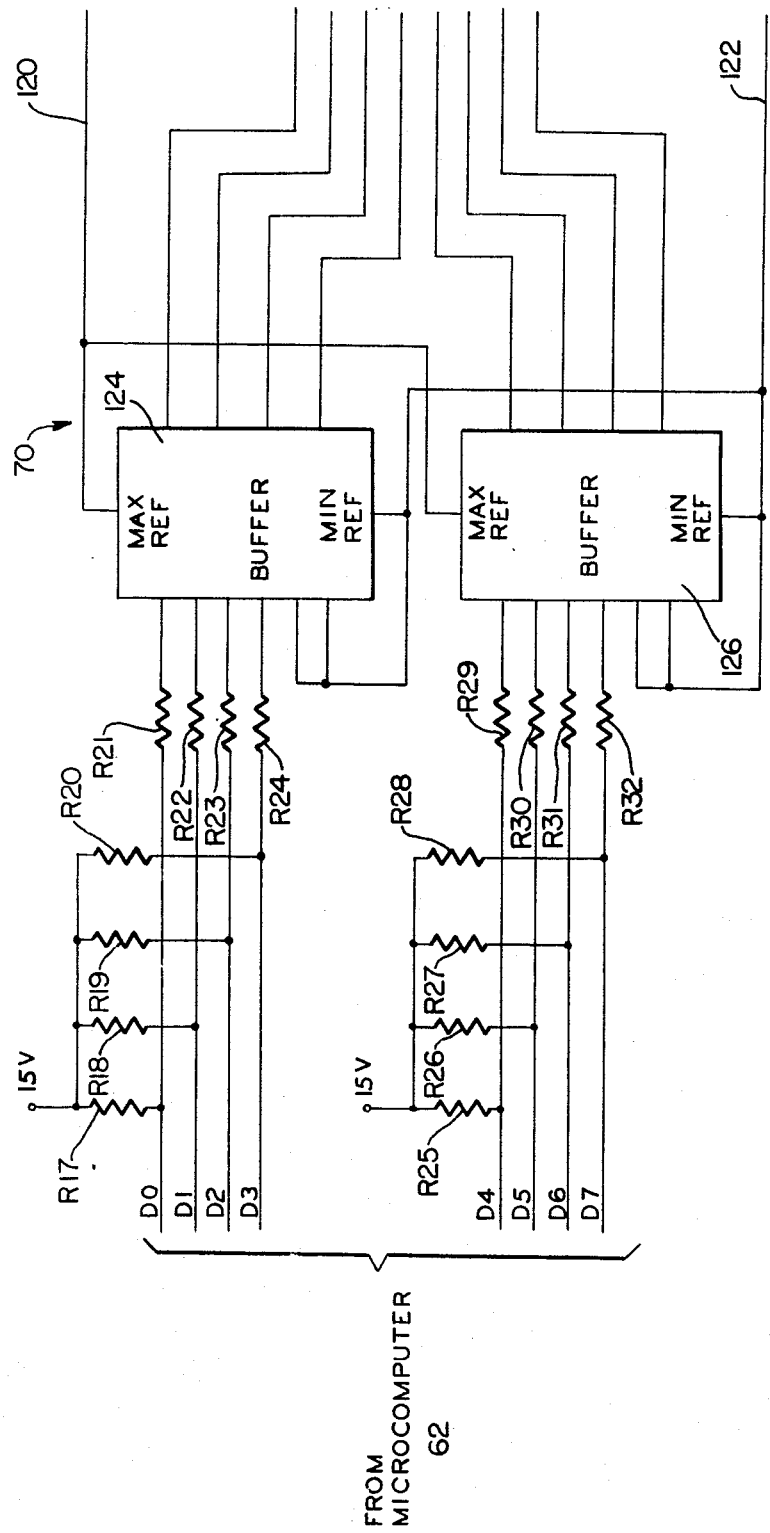
FIG. 4 (A-B) is a schematic diagram showing the feed rate drive circuitry of the present invention.
Figure 4B:
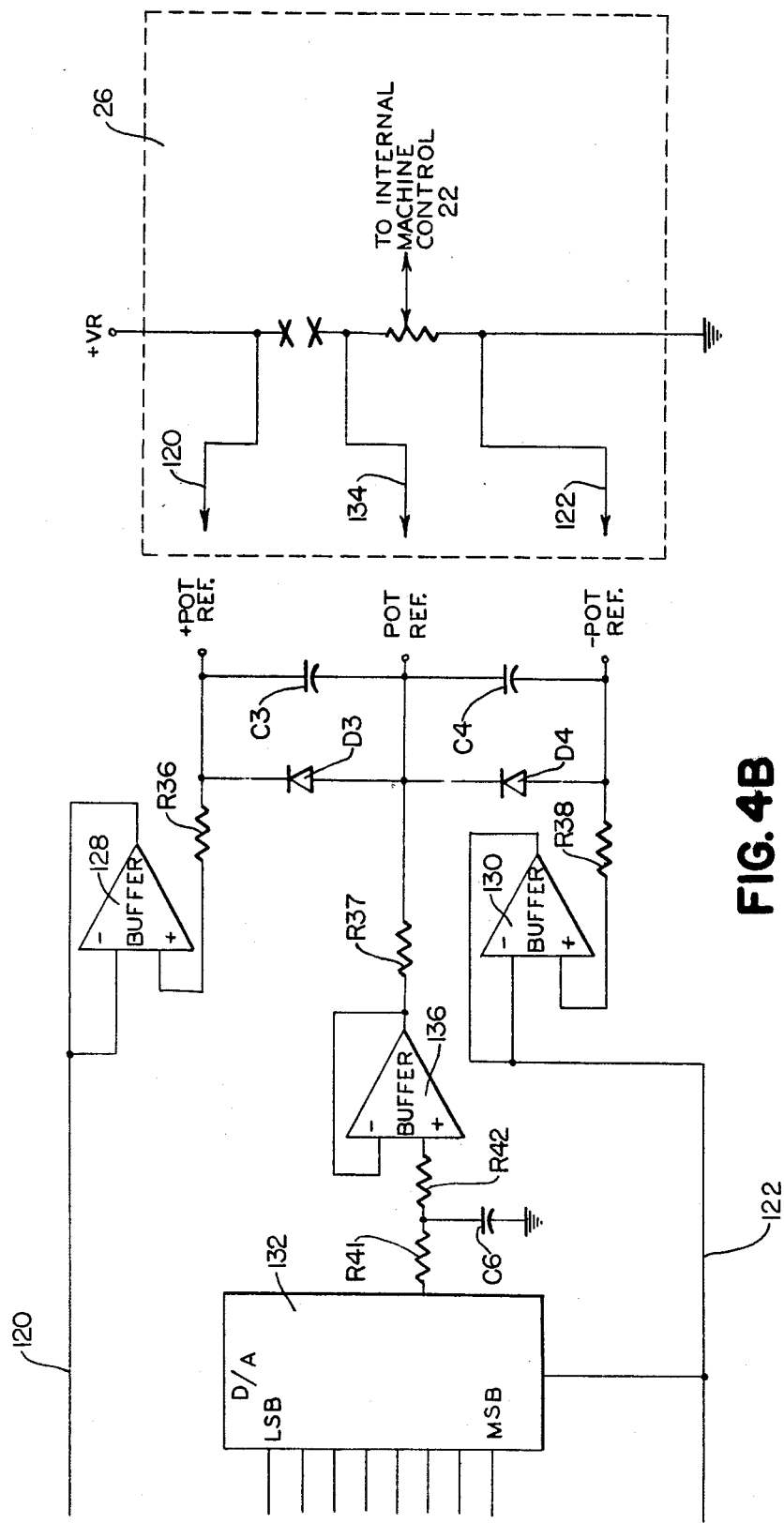

The operation of the feed rate drive control circuitry 70 may be understood upon reference to FIG. 4. Microcomputer 62 generates a feed rate control signal as an eight bit digital word over data lines D0-D7. The content of the digital word determines the amount of voltage which is ultimately applied to the feed rate motor 20 to control the feed rate. In the embodiment shown, the feed rate override potentiometer 26 (FIG. 4B) has been tapped as designated by the X's to give controller 30 primary control over the feed rate. As is known in the art, feed rate override potentiometers 26 are resistive divider networks providing the operator with the ability to adjust the feed rate manually as a percentage of full scale. The output of pot 26 is generally coupled to the internal machine control circuitry 22 which uses the output voltage as a base for controlling the drive signals to motor 20. The reference voltage (+VR) applied to pot 26 is generally the maximum rated voltage for the motor. In this embodiment, the line from the maximum reference voltage +VR is cut and applied via line 120 to provide a maximum reference level for the feed rate override drive control circuitry 70. Line 122 is coupled to the other side of the pot 26 to provide a minimum reference level, which in this embodiment is ground. The maximum and minimum reference levels on line 120 and 122 are coupled to the reference inputs to voltage controlled buffers 124 and 126 through isolation amplifiers 128 and 130, respectively. Resistors R17-R20 and R25-R28 serve as pull up resistors, whereas resistors R21-R24 and R29-R32 limit the current to buffers 124 and 126, respectively. The maximum and minimum reference voltages on buffers 124 and 126 cooperate to provide a voltage window for converting the digital bits of the feed rate control word to either the maximum or minimum reference voltage depending upon the states of the digits in the word. For example, the digits having a HIGH logic state will be converted to the maximum voltage whereas those digits at a LOW logic level will be converted to the minimum reference voltage level. Voltage controlled buffers 124 and 126 are commercially available as 4050 noninverting CMOS buffers. The voltage referenced digital outputs from buffers 124 and 126 are coupled to a digital to analog converter 132. D/A converter 132 converts the incoming data word to an analog voltage level as a function of the content thereof. If, for example, the data word was a binary 128 and the maximum reference +VR was +10 volts, the output of D/A converter 130 would be about +5 volts. This output is coupled to the wiper output of potentiometer 26 over line 134 after being buffered by isolation amplifier 136. If the wiper of potentiometer 26 is set to its full open position (maximum voltage), the base for deriving the drive signal to feed rate motor 20 is controlled directly from controller 30. Adjustment of the wiper enables the operator to further adjust the feed rate level as a percentage of the controller applied feed rate level. Hence, it can be seen that feed rate circuitry 70 can be readily adapted to a variety of different motor ratings automatically without circuit modification.

The functional diagram of FIG. 5 will aid the reader in understanding the functional operation of the controller of the present invention. FIG. 5 includes 5 functional columns from left to right defining: inputs and outputs of the controller; I/O control functions; power limit comparisons; delay timers; and operator programmable data.

Figure 5A:
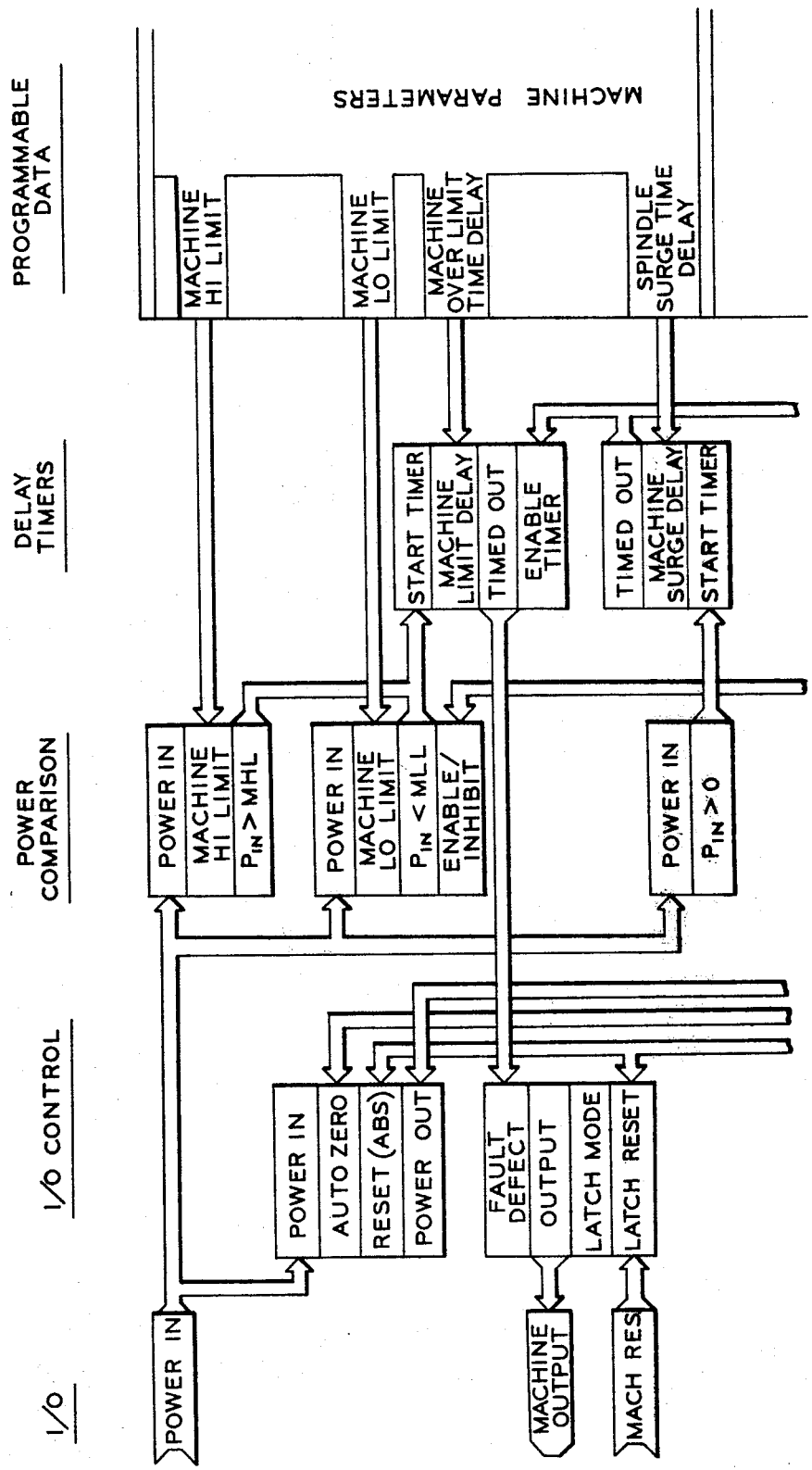
FIG. 5 (A-D) is a diagram illustrating the functional operation of the preferred embodiment.

FIG. 5A shows the functional operation for the machine parameter programmable data. Machine parameter data is that information which imposes overriding constraints on the machine 10. FIG. 7A illustrates the readout on display 34 for programming this data.

The MACHINE HI LIMIT is considered the absolute maximum power level which should never be exceeded during normal operating condition for the machine.

The MACHINE LO LIMIT is that minimum power level below which the machine should never fall during normal operation. Unlike the MACHINE HI LIMIT, which cannot be inhibited, the MACHINE LO LIMIT can be either enabled or inhibited depending upon the customer's applications. Typically, the MACHINE LO LIMIT is used to indicate broken belts, drive train problems or part-not-present conditions.

The machine OVER LIMIT TIME DELAY is that period of time which the customer will allow a machine fault condition (violating MACHINE HI or LO LIMITS) to exist without activating a machine alarm output.

SPINDLE SURGE TIME is a programmble period when all faults are inhibited during a temporary overpower condition due to machine start up power surges.

During machine operation, the absolute machine power consumption is compared with the MACHINE HI LIMIT and MACHINE LO LIMIT. If the machine power consumption violates either of these limit values, the machine OVER LIMIT TIME DELAY timer effectively begins running and once the fault condition continues for that period of time, a MACHINE OUTPUT (one of output lines 42) is activated. The state of the MACHINE OUTPUT line is normally closed and is opened whenever the MACHINE HI LIMIT or MACHINE LO LIMIT is exceeded for the machine OVER LIMIT TIME DELAY.

Figure 5B:
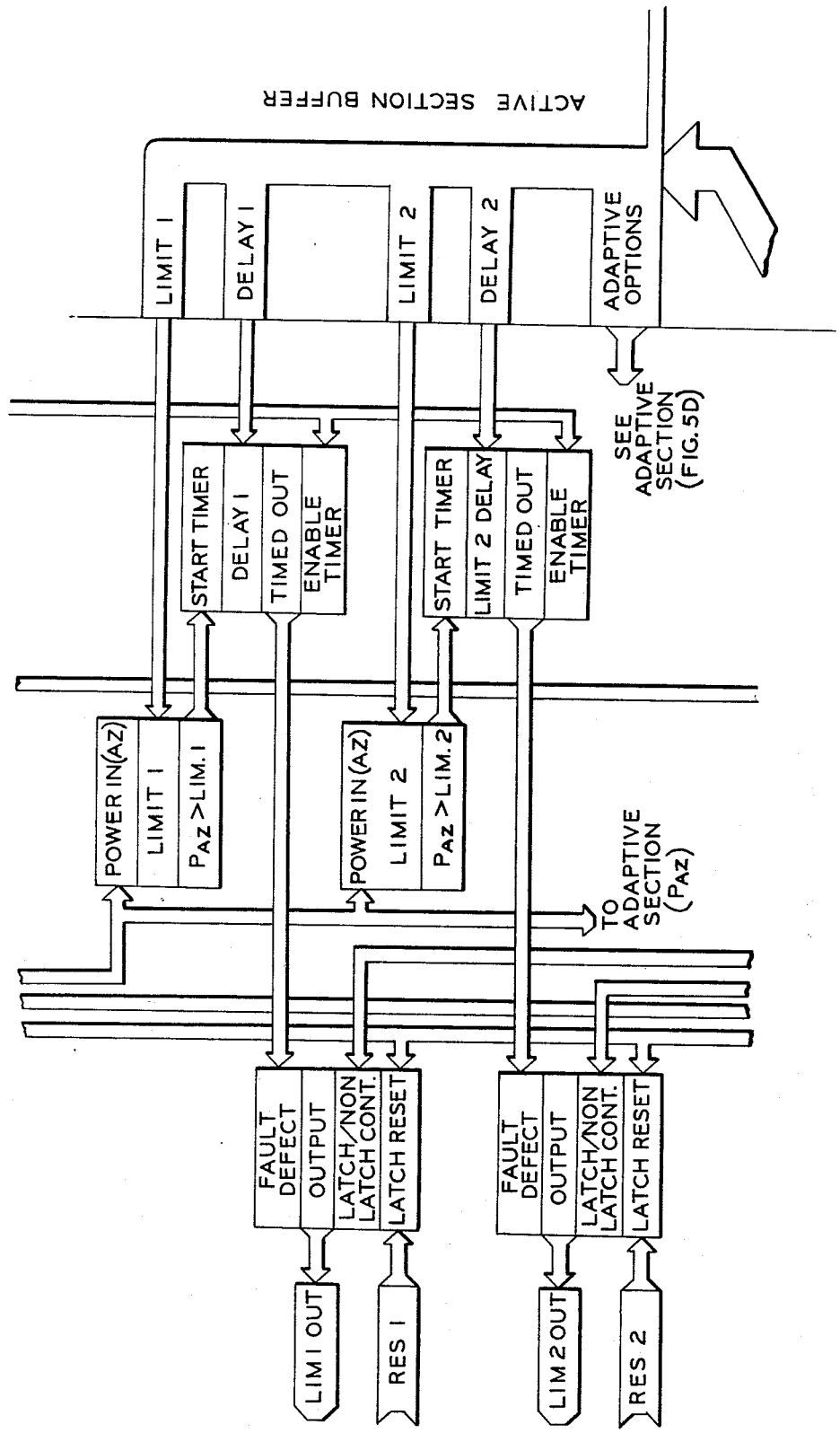

FIGS. 5B and 7B illustrate the programmable section limits of the preferred embodiment. Each machine has a number of programmable sections, each with its own set of parameters. For examle, machine 10 may have one section which sets the parameters for a boring operation and another section sets parameters for a milling operation. Similarly, different sections may be called up depending upon the position of the workpiece relative to the cutting tool. For example, as shown in FIG. 1, when workpiece 14 successively trips limit switches 24, a new section may be called up which would set new operating criteria for the machine. Each section is identified by a binary coded decimal number. Thus, whenever the parameters for this particular section are required to be active, internal machine control 22 places an identifying BCD number on the bus 28 which selects the desired section parameters.

LIMIT 1 is typically used as a high horsepower limit for the sectional operation.

DELAY 1 is a user programmable time delay which defines the length of time that the LIMIT 1 parameter may be exceeded before the LIMIT 1 output is tripped.

LIMIT 2 is another available power parameter which the user may program to fit his application.

DELAY 2 functions the same as DELAY 1 but corresponds to LIMIT 2. Both DELAY 1 and DELAY 2 are programmable in tenths of a second.

In operation, the currently active section continuously compares the auto zeroed power level (to be described below) with the LIMIT 1 and LIMIT 2 values. If either of these limits are exceeded for their programmed time delay periods, their corresponding limit output will be tripped. The state of the LIMIT 1 output (one of lines 42) is normally closed which will be opened when a fault is detected. Conversely, the state of the LIMIT 2 output (one of lines 42) is normally open and will be closed when the fault is detected. Each section may include an adaptive option for adaptively controlling machine operation. This will be described further in connection with FIG. 5D.

Figure 5C:
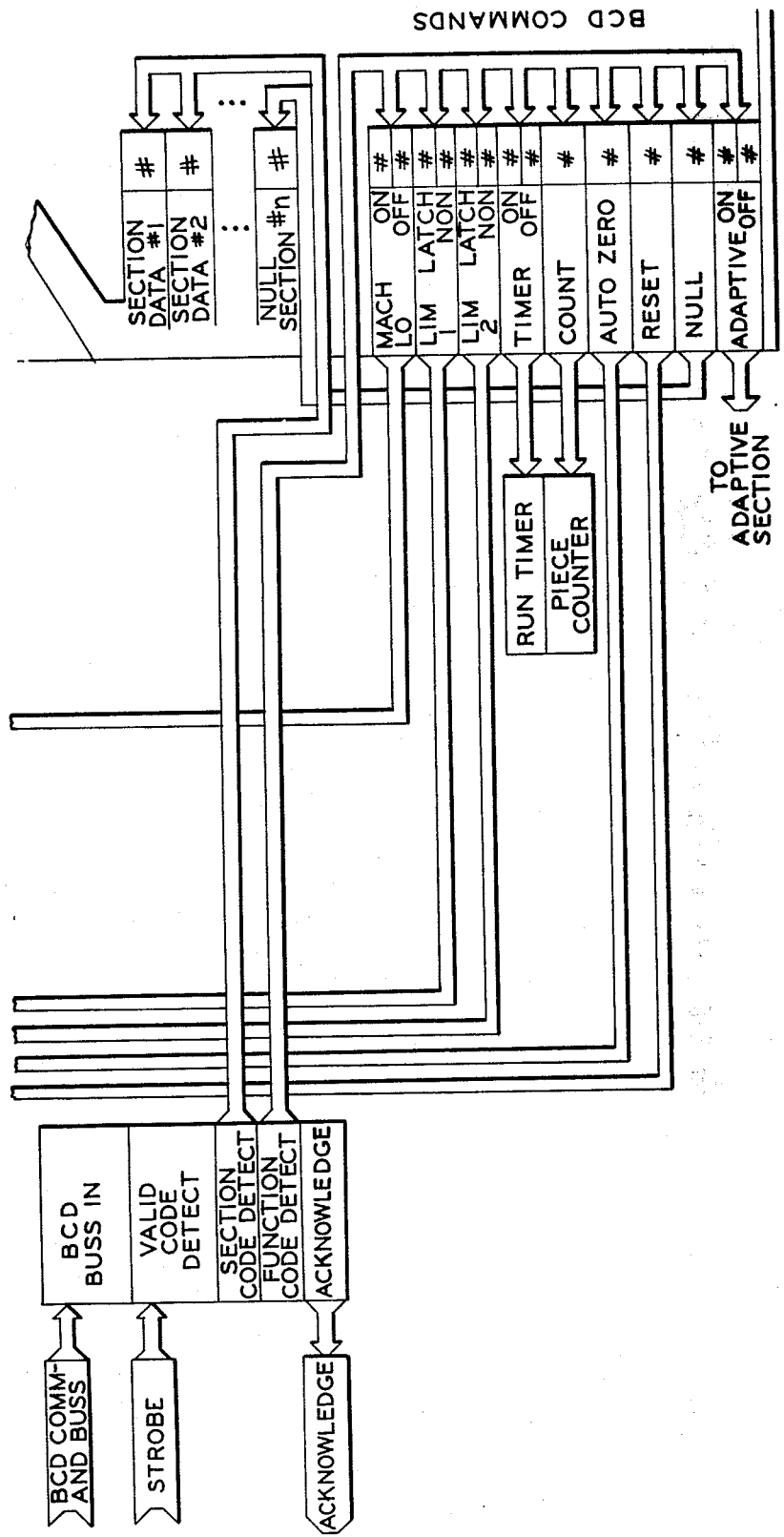

FIGS. 5C and 7C illustrate programmable BCD controlled parameters. The BCD parameters are defined by placing a numerical code adjacent to the desired function and entering that code into the program of the internal machine control 22 as well. When the BCD code numeral is sent over bus 28, the controller 30 carries out the functional parameter corresponding to the BCD command code. The eight bit BCD data bus 28 is continuously monitored by controller 30 for valid program data. A valid programmed command is indicated by a 100 millisecond acknowledge (ACK) pulse. The BCD command codes control system operation by enabling/disabling various functions, calling up appropriate sections, etc. In order for the correct parameters to be active during a specific machine cycle, the BCD command code calling up the proper sections must be sent by the machine's internal control 22 just prior to the beginning of that machining operation. While this machining operation is active, the power limits for that section will be continuously monitored until a new section is called up by the appropriate BCD command codes from internal machine control 22.

The following is a list of BCD programmable parameters.

MACHINE LO LIMIT ON/OFF selectively enables or disables the MACHINE LO LIMIT parameter previously discussed, i.e. if the MACHINE LO LIMIT is disabled, the MACHINE OUTPUT will remain closed regardless of whether the machine power consumption has fallen below the MACHINE LO LIMIT level.

As noted above, each section of this machine has two programmable limits: LIMIT 1 and LIMIT 2 with their associated outputs. The LIMIT 1 output is normally closed whereas the LIMIT 2 output is normally open. According to a feature of this invention, these limits may be latching or nonlatching (momentary) by the use of the correct BCD command. In a nonlatching mode these outputs will change state only for as long as the associated limit value is exceeded. When in a latched mode, the output is latched in its opposite state when the limit is exceeded and remains latched until reset by manually activating the appropriate reset switch, by inputting the BCD command code for reset from the machine's internal control 22, or by appropriate operator response on keyboard 36.

The TIMER command selectively enables a timer whose time period is conveniently displayed on display 34.

The COUNT command increments a displayable counter on display 34 by one which may be used as a piece counter.

A/Z (auto zero) causes controller 30 to store the absolute power at the time that the command is received and is utilized by substracting it from subsequent power readings. Section limits LIMIT 1 and LIMIT 2 and the adaptive limits to be discussed use the auto zeroed value while the machine limits (MACHINE HI LIMIT and MACHINE LO LIMIT) use the unzeroed absolute power consumption.

The RESET BCD command resets any latched output, returns the auto zero and displayed power to the absolute power value, and transfers machine control to a null mode in which LIMIT 1 and LIMIT 2 are disabled.

The NULL command inhibits all section parameters (LIMIT 1, LIMIT 2, and adaptive).

The ADAPTIVE BCD command enables or disables the adaptive parameters for the active section.

Figure 5D:
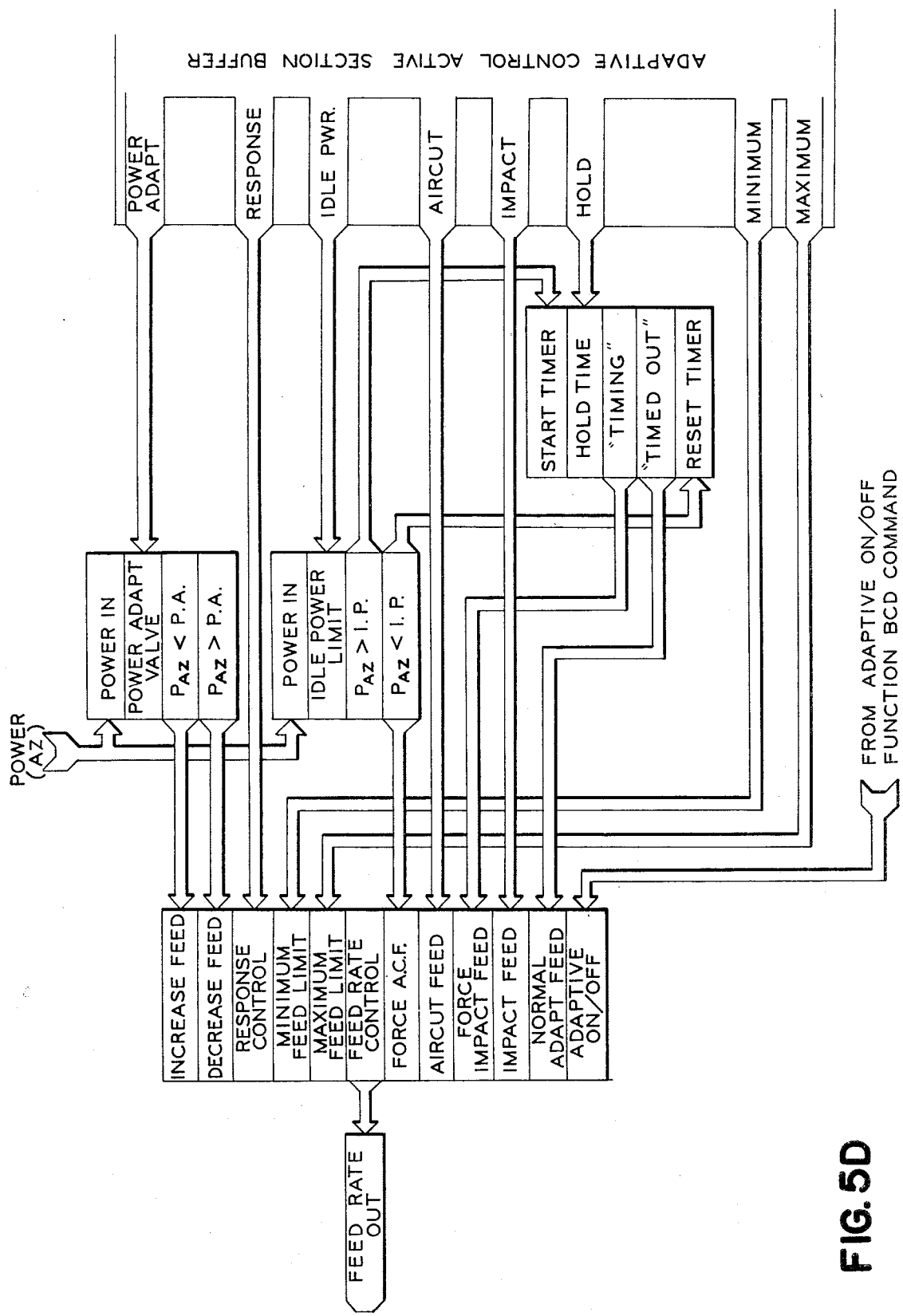

FIG. 5D and portions of FIG. 7B illustrate the programmable parameters for the adaptive control mode. Adaptive control provides for constant power during machining operations by monitoring the power input and controlling the machine feed rate to maintain a programmed adaptive power level.

The adaptive power level (ADPT PWR) is the desired power level of a machining operation that controller 30 will maintain during normal operation by adjusting the feed rate.

RESPONSE is the rate at which the feed rate will change in order to maintain the adaptive power level. The RESPONSE value is a percentage of a preprogrammed feed rate change function as will be later discussed more fully herein. Values below 49% will decrease the RESPONSE while values above 50% will increase the rate of feed rate change.

The IDLE PWR programmable parameter is generally chosen to be that level of power which is slightly above that normally dissipated by the machine when tool 12 is not in contact with workpiece 14.

AIR CUT is the feed rate governing machine operation when the input power level falls below the IDLE POWER level. It is expressed as a percentage of maximum available feed rate.

IMPACT is the feed rate level which will be utilized when the input power rises above the IDLE POWER. It is expressed as a percentage of maximum available feed rate.

HOLD defines a time period for which the IMPACT feed rate will be maintained after the IDLE POWER level is exceeded. It is programmed in tenths of a second.

The MAXIMUM and MINIMUM programmable values define the upper and lower feed rate limits while under adaptive control.

Briefly, the input power is continuously compared with the two programmed power limits: IDLE POWER and ADAPTIVE POWER. Depending upon the comparison, the feed rate control output will be adjusted to correct the feed rate of workpiece 14 to bring it within the desired limits. Briefly, if the input power is below the IDLE POWER limit, the controller 30 will cause workpiece 14 to be fed at the AIR CUT feed rate. Once the IDLE POWER limit has been exceeded the impact rate will be generated by controller 30 for the amount of time defined by the HOLD time period. After the HOLD time period has elapsed, the feed rate will be increased or decreased by a change rate whose magnitude is, in part, determined by the RESPONSE level in order to bring the machine power consumption in line with the ADAPTIVE POWER level.

PROGRAM DESCRIPTION

FIG. 6 (A-J) shows a detailed flow chart of the program for instructing the operation of controller 30. As is known in the art, program instructions are stored as software in memory module 106 preferably in EPROM portion. Microprocessor 100 sequentially addresses the instructions of the program over address bus 102 to perform the instructed operation and, when appropriate, provides data output signals to PIA 110 or ACIA 112. Program instructions are generally executed in a cylical fashion in which the program checks for the status of certain operational inputs and provides the necessary control outputs in response thereto.

Figure 6A:
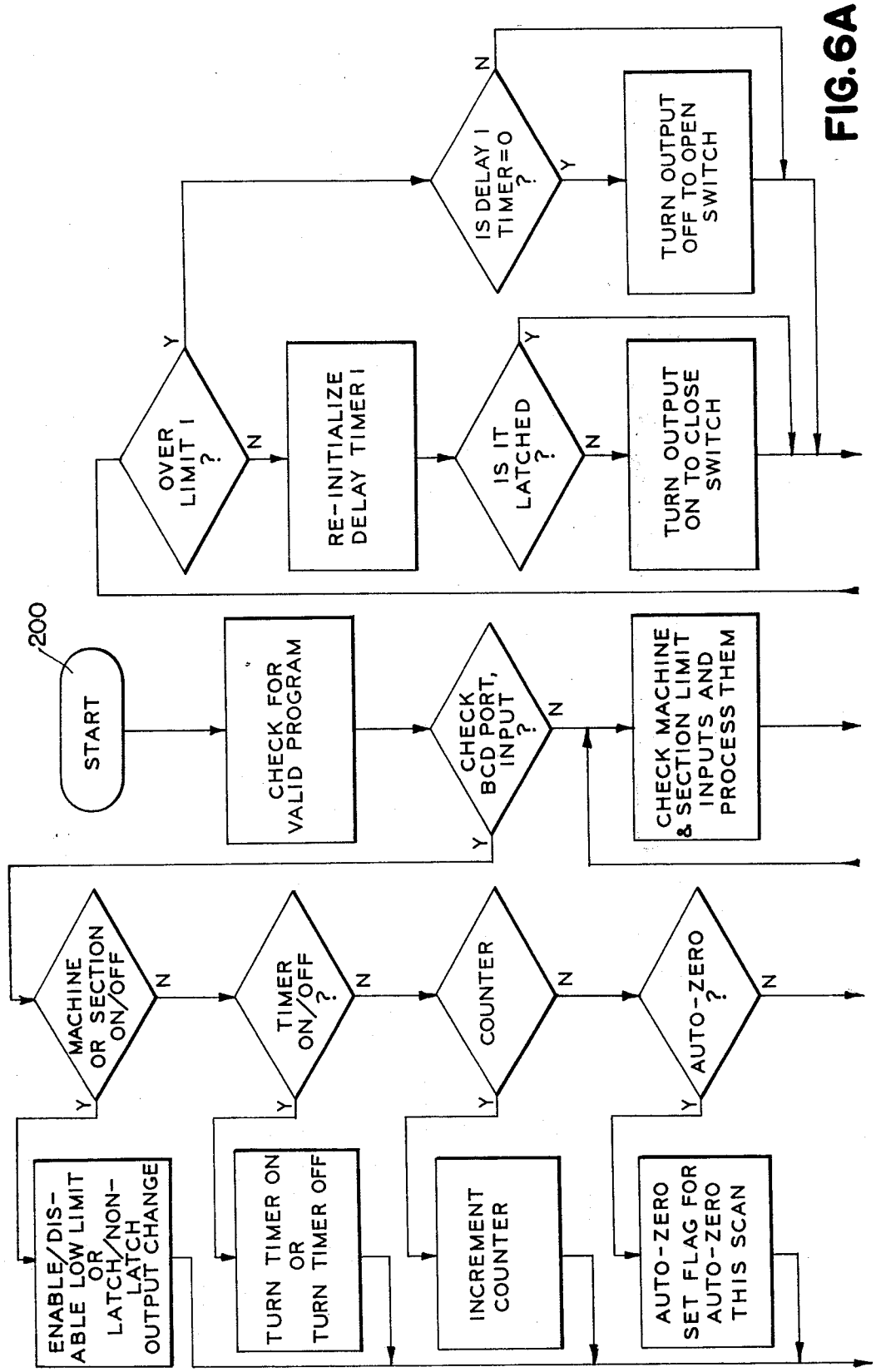
FIG. 6 (A-J) is a flow chart illustrating the sequence of software instructions for programming the microcomputer of the preferred embodiment.
Figure 6B:
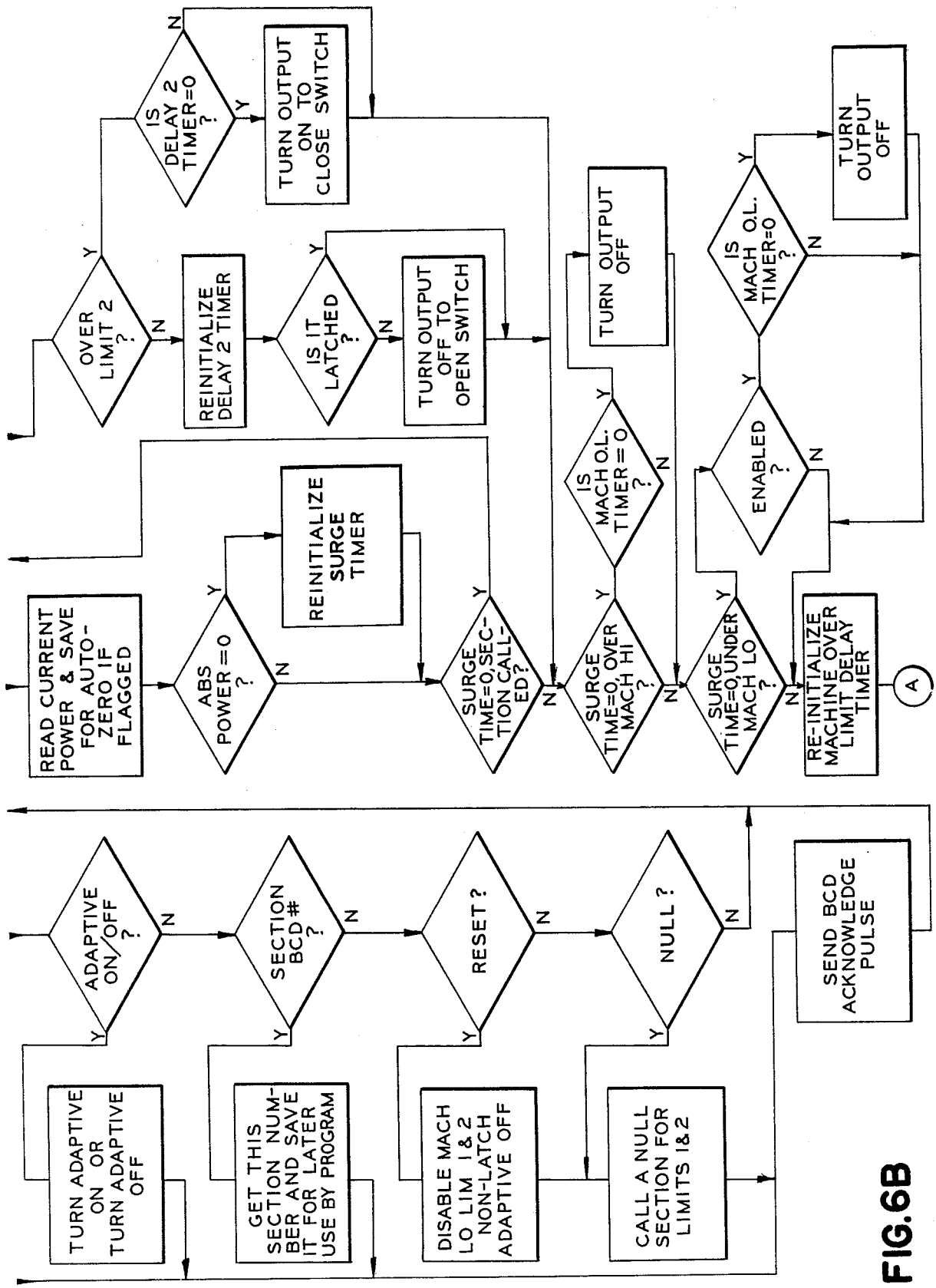

Upon energization of controller 30 the program begins its cycle as represented by box 200 (FIG. 6A). The program makes an initial check to insure that valid program data has been stored in the EAROM portion of memory module 106. The programmed parameters are initially loaded into RAM and into EAROM memory portions to sve the data in the event of power so that the user need not reprogram the parameters every time controller 30 is shut off. If the program parameters are valid, they are loaded into RAM portion for processing during operation. The programmable parameters discussed above are loaded into memory module 106 by the program portion labeled DISPLAY shown in FIGS. 6F-6I. Keyboard 36 includes keys labeled MACH PARA, MACH BCD, and SCTN which cause screen display 34 to display a visual indication of the selectable machine parameters as shown in FIG. 7A, the BCD controlled parameters shown in FIG. 7C, and the section parameters shown in FIG. 7B, respectively. The program senses the activation of any of these keys and causes the screen to display these programmable parameters. A cursor or arrow is initialized to point to the first programmable limit displayed. At this time the operator types in the requested information. When the ENTER key is pushed (FIG. 6I) the data is entered into display keyboard interface card 74 and loaded into memory module 106 through ACIA 112 of the microcomputer board 62. This process continues until all of the necessary information is programmed by the operator. Reference to the multiplicity of programmable parameters shown in FIG. 7 makes it apparent that the user has an extremely wide variety of programmable parameters which are readily adaptable to a diverse number of machining operations. When programming the BCD parameters the operator types in a number adjacent to the function to be performed. When that number is generated by the internal machine control circuit 22 over the BCD command bus 28, controller 30 matches that number with the programmed function. For example, the arrow is pointed to LIMIT 2 in FIG. 6C. The operator has typed in the number 15 to define the LIMIT 2 output latched condition and the number 16 for the nonlatched condition. The machine internal controller 22, which may be a known computer numerical controlled (CNC) system places the number 15 on bus 28 when the LIMIT 2 output is to be latched and the number 16 when it is not to be latched.

Turning back to FIG. 6A, controller 30 checks the status of the BCD input bus 28 and if a new number has been placed thereon it will proceed to condition controller 30 with the program function at the appropriate time. With reference to FIG. 7C, assume that numbers 11, 13, 15, 17 and 21 are received over the BCD communication bus 28. Controller 30 would match these numbers with those stored in a table in memory 106 and set flags in preselected memory locations indicating that such functions should be performed at the appropriate timed sequence. FIG. 8 schematically represents two eight bit words in memory for storing the flags. In our example, bits 0, 1, 6 and 7 of word 1 would be set and bit 2 of word 2 would be set. After the appropriate flags have been set with each valid BCD input controller 30 generates an acknowledge (ACK) pulse to internal machine control circuit 22.

Controller 30 then progresses to check whether new machine or section parameters have been entered and if so, they are loaded into appropriate memory locations. Software counters are initialized by loading predetermined memory locations with a count number which is a function of the programmed time delay.

The current power reading from power sensor 40 is monitored and saved for auto zeroing if requested by the appropriate BCD command.

When the absolute machine power is zero prior to start up of the machine, the surge timer is initialized to its original count. After machine start up, the timer begins to count down and will time out after programmed SPINDLE SURGE TIME has elapsed. Until the SPINDLE SURGE TIMER has timed out, all power conparisons are disabled. In such manner expected surges in machine power consumption due to start up will not adversely affect controller operation which may otherwise consider the start up power as an over limit condition.

Once the SPINDLE SURGE TIMER has timed out, controller 30 determines whether a machine section has been called by a BCD command. If so, the section programmable parameters will be utilized to control portions of the operation. If a section is called, the auto zeroed input power is compared with the LIMIT 1 power level. If it is over the limit the associated output switch is not immediately caused to change state but will do so only if the DELAY 1 timer has timed out. If it has not timed out the program progresses through its cycle and will check the condition of the DELAY 1 timer on the next cycle. For example, if DELAY 1 timer is set at 1 second, the switch is not activated until 1 second has elapsed in which the machine power consumption has continuously exceeded the LIMIT 1 level. Since this is a programmable time delay, expected fluctuations in the machine operational environment will not alter the machine operation. It should be noted that the switch may take many forms and in this example is a bistable device such as a flip flop in I/O card 72 whose output is coupled to a dedicated output line 42. The user may utilize this dedicated line for many purposes but generally it is used to control some component in the machine.

If, on the other hand, the input power is within the LIMIT 1 value, the DELAY 1 timer is reinitialized to its starting count. Thus, the timer will not be allowed to time out since it will be continuously reinitialized as long as the input power is within limits.

Assume, for example, that the switch associated with LIMIT 1 has been activated (which would open the switch since it is normally closed) due to a previous over limit condition. It is a feature of this invention that the user can selectively determine whether the switch remains in that state if subsequently the machine power consumption comes back within limit. Controller 30 checks for the status of the latched/nonlatched flag shown in FIG. 8. Note that in this embodiment, the BCD commands control the status of bits 1 and 2 of word 1 in FIG. 8, and the controller 30 via microprocessor 100 sets bits 3 and 4 depending on the current state of switches #1 and #2. If the associated switch is to be latched, the state of the switch will not be changed. On the other hand, if it is nonlatched, the switch will return to its closed position if the power returns to within limits. This feature gives the user added flexibility. For example, if the switch associated with the LIMIT 1 output controls the feed hold to machine 10, the machine feed will automatically be reinstated as soon as the power consumption comes within limits if the switch is nonlatched. On the other hand, if the switch is latched, feed will only be resumed upon manually pressing limit 1 reset button 46 (FIG. 1) to restart the machining operation or other reset commands noted above. A wide variety of other useful advantages can be readily envisioned.

Controller 30 then progresses to check whether the input power is over the LIMIT 2 level. The same steps utilized in the LIMIT 1 condition are used to determine whether the switch associated with the LIMIT 2 condition is to be activated. However, in the preferred embodiment, the LIMIT 2 switch is normally open so that an over limit condition would close the switch.

Generally, the values for LIMITS 1 and 2 are chosen tod define a window within which the particular machine operation performed in that section should be maintained. In comparison the MACHINE HI LIMIT is generally the maximum acceptable power consumption for the machine regardless of the type of operation it is performing.

In some operations, section parameters may not be called and thus the machine HI and LO limits provide the only power constraints. Assuming that the SPINDLE SURGE TIMER has timed out, controller 30 determines whether the absolute power consumption is over the MACHINE HI LIMIT. If it is and the machine OVER LIMIT TIMER has timed out, an alarm output signal is applied to the machine. This output signal generally is used to turn the machine off. Similarly, if the MACHINE LO LIMIT is enabled and the power is below this limit, the alarm signal is generated to turn the output off assuming the machine OVER LIMIT TIMER has timed out. It should be remembered that the MACHINE LO LIMIT can be disabled by an appropriate BCD command. Also, it should be understood that the output signals are not generated until the over limit conditions have been continuously exceeded for the programmable OVER LIMIT TIME delay similar to the LIMIT 1 and LIMIT 2 outputs. If the above power comparisons show that the machine is operating within limits, the machine OVER LIMIT TIME DELAY timer is reinitialized and the program enters the adaptive control mode if selected.

Figure 6D:
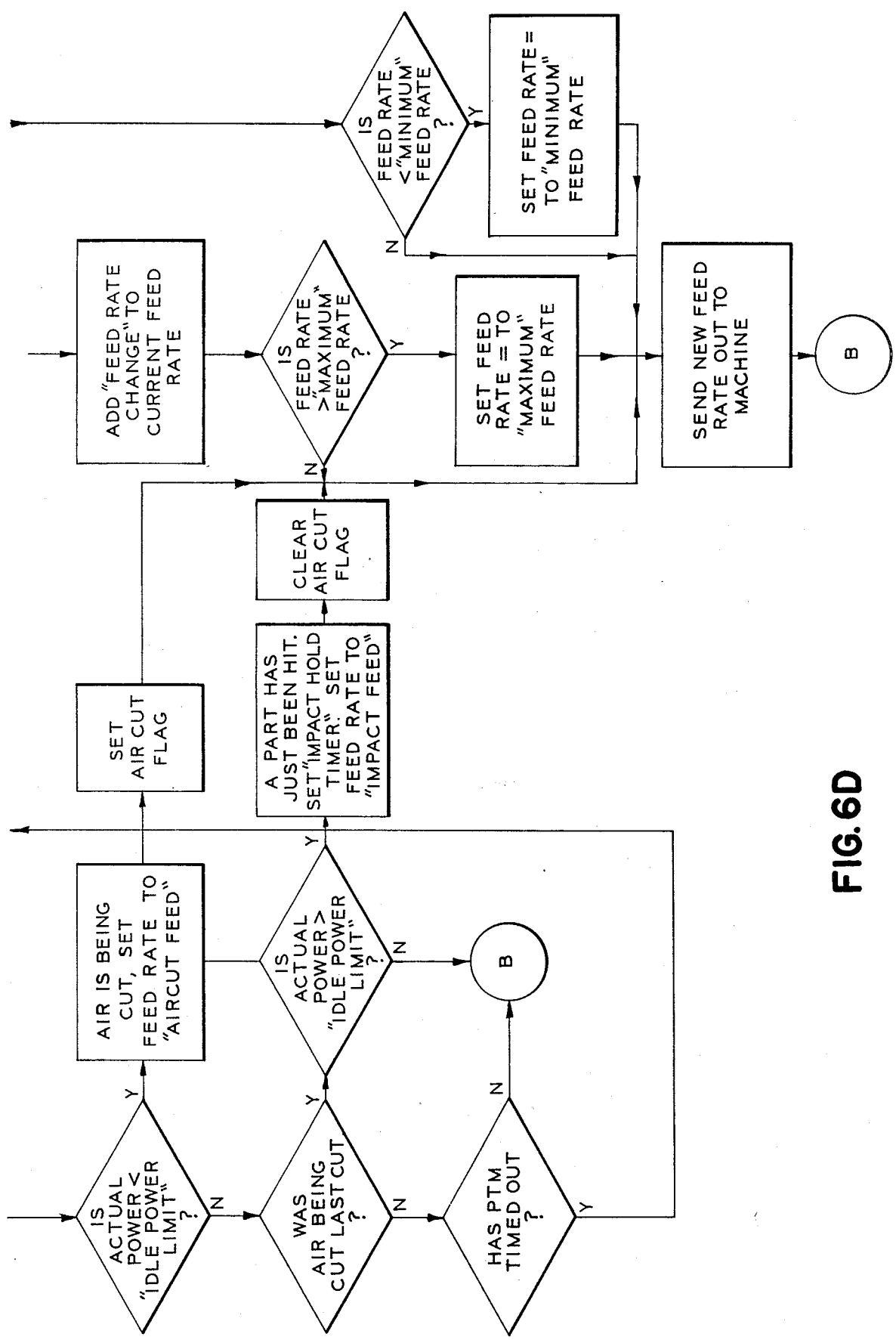

FIGS. 6C and 6D illustrate the flow chart of the adaptive control portion of the program. If the adaptive control has been requested by the appropriate BCD command, the controller checks the content of the impact hold timer. If it is 0, the controller compares the input power with the IDLE POWER limit. When the input power is less than the IDLE POWER limit and the impact HOLD timer is 0, controller 30 realizes that air is being cut, i.e. that the tool 12 is not contacting the workpiece 14. The AIR CUT feed rate is fetched from the memory and forced on the feed rate control line 52 to control the machine feed rate. The AIR CUT feed rate is generally a relatively high value so that the workpiece can be brought into position for machining very quickly. The controller sets an air cut flag and the workpiece is fed at the AIR CUT feed rate until the actual power consumption exceeds the IDLE POWER limit. This increase in power consumption is due to the impact of the workpiece 14 against tool 12. Such an occurrence causes the controller to begin decrementing the impact HOLD timer. The feed rae is also changed to the generally slower IMPACT feed rate. The feed rate is maintained at the IMPACT feed rate until the HOLD timer has timed out. The utilization of the transition impact feed rate for the selected time period enables the machine to recover from the usually fast AIR CUT feed rate and stablize before continuing onto the normal adaptive machining operation. Since both the IMPACT feed rate and the HOLD time for which it is applied are selectively programmable, the controller can be individually adapted to the user's particular application.

After the impact HOLD timer has timed out, the controller enters into the normal adaptive feed rate determination sequence in the program. This sequence is entered on a constant time base defined by the time period of programmable timer 108. In the preferred embodiment this programmable time period is one tenth of a second. The program continuously compares the actual power consumed by the machine with the desired ADAPTIVE POWER (ADPT PWR) which has been previously programmed. The difference therebetween is referred to as positive or negative error defined by the adaptive power being greater than or less than the actual power, respectively. Controller 30 sets an ERROR SIGN flag initially in a positive state. If the actual error is negative, it is multiplied by a 31 'and the ERROR SIGN flag status is reversed to show that the error is negative. Thus, regardless of whether the error is negative or positive the input to the FEED RATE CHANGE routine will be a positive number, yet the status of the ERROR SIGN flag, which will be later retrieved, serves to save the original sign of the comparison.

Figure 6E:
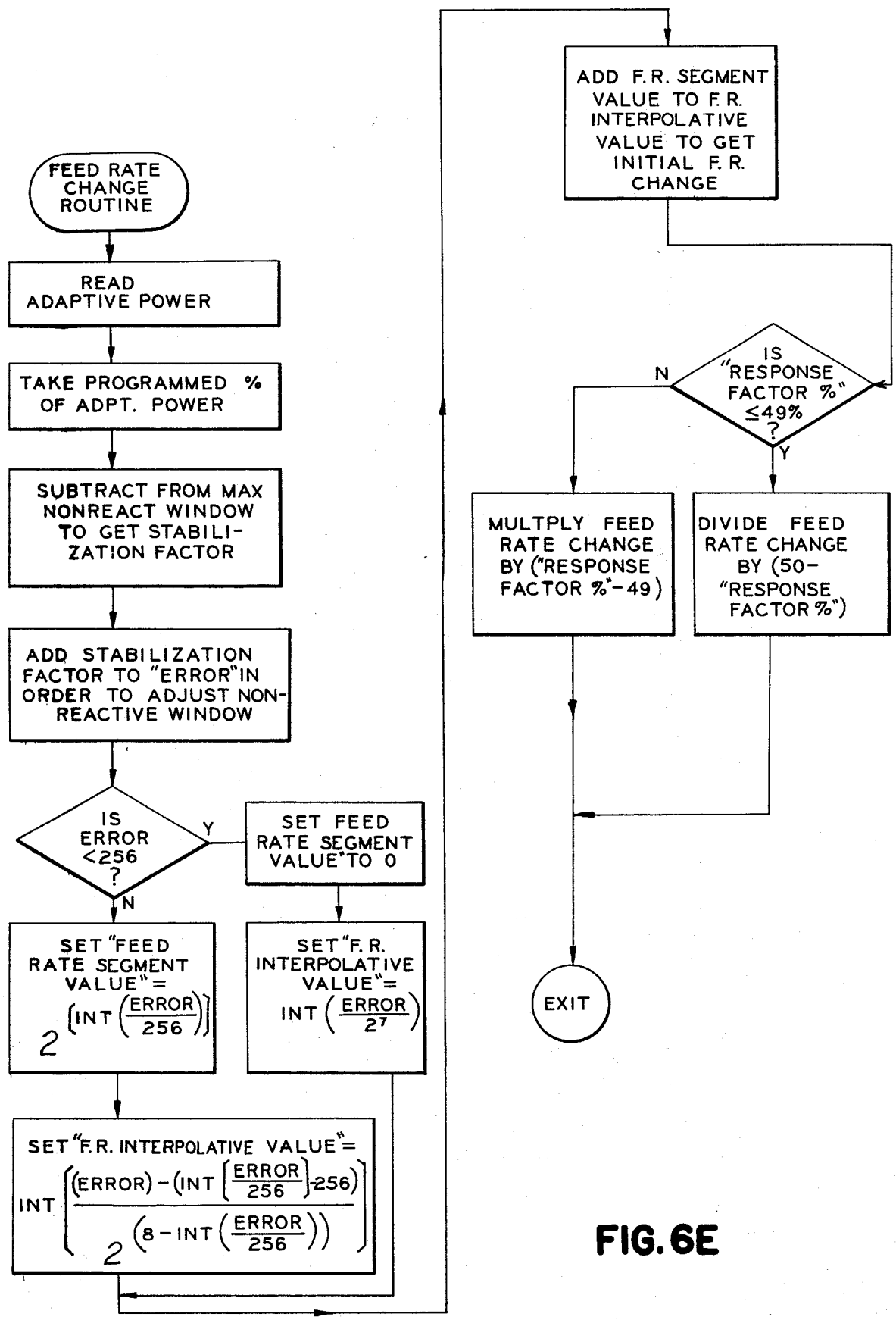

At this point in the program it calls a FEED RATE CHANGE routine which is shown in FIG. 6E. One unique aspect of this invention is the provision of a nonreactive window such as that shown in FIG. 10 in which no feed rate change is generated if the error is within the confines of this window. In this embodiment, the maximum nonreactive window has a value of 128. However, provision is made to adjust the nonreactive window to accommodate different user applications. It is desirable to have the nonreactive window to be proportional to the selected ADAPTIVE POWER level since more noise can be expected at the higher power levels. Accordingly, the program reads the selected ADAPTIVE POWER and generates a preprogrammed percentage of that power level. The programmed percentage, while not being user programmable in this embodiment, is readily changed by the manufacturer to accomodate the user's application. The percentage of ADAPTIVE POWER is subtracted from the maximum number defining the nonreactive window to thereby generate a STABILIZATION FACTOR. This STABILIZATION FACTOR is added to the ERROR in order to adjust the nonreactive window. Thus, the curve shown in FIG. 10 is effectively shifted to the left depending upon the quantity of the STABILIZATION FACTOR which, in turn, is a function of the adaptive power level.

The present invention advantageously uses a nonlinear exponential feed rate change function to calculate the feed rate change when there is an ERROR difference between the actual machine power consumption and the desired ADAPTIVE POWER level. In such manner, the amount of feed rate change generated is several times larger at high error levels than at lower error levels. This nonlinear characteristic is extremely effective in stabilizing the machine operation. The advantages of using the exponential function becomes apparent when compared with known linear or straight line functions. In FIG. 10 the dotted line A represents a known linear curve. It can be seen at error levels of 1,024 that the feed rate change would be approximately 100. This level of change may be determined by the user to cause system oscillations in his particular application. However, in order to bring the feed rate change down to a lower level, for example, to about 10, the prior art uses damping attenuation circuits which would bring the feed rate change down to the desired level as shown in curve B. However, this damping also affects the feed rate change level at the higher error levels, thereby slowing down the system response. In comparison, the exponential feed rate change function utilized by the present invention gives the user the best of both worlds wherein large feed rate changes are generated at large error levels without sacrificing the ability to generate substantially lower feed rate change levels at lower errors to prevent system oscillations and maintain stability.

Pursuant to the present invention the feed rate change is generated by controller 30 as a digital approximation of an exponential function of the ERROR according to the formula:

FEED RATE CHANGE $= 2^{(ERROR/N)}$ where N is a positive integer. The interger N defines a scaling factor and is chosen in this embodiment as 256 to aid in computerized calculation of the feed rate change level.

The curve generated by the above formula is approximated by a series of discrete feed rate change values. The series of values can be drawn as in FIG. 10 to represent a piecewise linear approximation. Each segment (FEED RATE SEGMENT VALUE) of the linear approximation has an initial value given by the equation:

F.R.SEG.VAL. $= 2^{(INT(ERROR/N))}$

An interpolative value (FEED RATE INTERPOLATIVE VALUE) within a given segment can then be determined using the following relationship:

$$F.R.INT.VAL = INT\left(\frac{(ERROR) - (INT(ERROR/N) \times N)}{2^{(8-INT(ERROR/N))}}\right)$$

where INT represents the integer function. The feed rate change value for a given error is thus the sum of the FEED RATE SEGMENT VALUE and the FEED RATE INTERPOLATIVE VALUE.

The program of the present invention efficiently calculates a new feed rate change level every 0.1 second as defined by the time base of programmable timer 108.

By way of a specific example and with reference to FIGS. 6E and 10, assume that the ERROR is 1500. The FEED RATE SEGMENT VALUE is

| F.R.SEG.VAL | $= 2^{(INT(ERROR/N))}$ |
|---|---|
| | $= 2^{(INT(1500/256))}$ |
| | $= 2^{(INT\ 5.86)}$ |
| | $= 2^5$ |
| | $= 32$ |

Microprocessor 100 thus calculates this value according to the above equation using known techniques and stores it in memory 106 for further use. By reference to FIG. 10 it can be seen that the value 32 represents the starting point for the segment in which the ERROR of 1500 falls.

Microprocessor 100 then determines the FEED RATE INTERPOLATIVE VALUE within that segment using linear interpolation techniques according to the formula:

$$F.R.INTP.VAL = INT\left(\frac{(ERROR) - (INT(ERROR/N) \times N)}{2^{(8-INT(ERROR/N))}}\right)$$

$$= INT\left(\frac{(1500) - (INT(1500/256) \times 256}{2^{(8-INT(1500/256))}}\right)$$

$$= INT\left(\frac{1500 - (INT\ 5.86) \times 256}{2^{(8-INT(5.86))}}\right)$$

$$= INT\left(\frac{1500 - 1280}{2^3}\right)$$

$$= INT\left(\frac{220}{8}\right)$$

$$= INT\ [27.5]$$

$$= 27$$

Hence, the initial FEED RATE CHANGE VALUE is:

| F.R.CH.VAL | = F.R.SEG.VAL + F.R.INTP.VAL. |
|---|---|
| | = 32 + 27 |
| | = 59 |

The special case of the ERROR being less than N is provided by the decision block in FIG. 6E which branches the program to set the FEED RATE SEGMENT VALUE to 0 instead of the expected value of 1. The interpolation to generate the FEED RATE INTERPOLATIVE VALUE is simplified in this case to the integer function of the ERROR divided by $2^7$.

The curve shown in FIG. 10 shows the entire spectrum of feed rate change levels calculated by the program of the present invention. Alternatively, memory module 106 could contain a table of all of the feed rate changes in which the error would address the memory and fetch out its corresponding feed rate change. However, this would require a substantial amount of memory, in this example being 2,048×8 bit locations.

According to still another feature of this invention, the initial feed rate change level thus calculated is user adjustable to provide various response factors. In FIG. 9, the unadjusted or normal feed rate change response curve is shown and labeled "NORMAL". The NORMAL curve, however, can be adjusted depending upon the user application by programming in the desired response factor which is a section programmable parameter (FIG. 7B). A 50% response factor will select the NORMAL curve shown in FIG. 9. Response factors above 50% will increase the response rate along the lines of the curve labled >50% in FIG. 9. Conversely, response factors of less than 50% will decrease the response rate along the lines of the curve in FIG. 9 labeled <50%. As shown in FIG. 6E, the program fetches the selected response factor from memory 106. If it is less than or equal to a 49% cut off level, the previously generated feed rate change level is divided by 50 minus the response factor percentage. Conversely, if the response factor percentage is above the cut off level, the feed rate change is multiplied by the difference between the response factor percentage less 49. The cut off level is chosen at 49 merely for convenience since otherwise the difference would be a zero when the 50% normal rate is selected by the operator.

After the new feed rate change has been generated, the program determines the condition of the ERROR SIGN. If it is negative, the feed rate change is subtracted from the current feed rate. Conversely, if the negative ERROR SIGN flag has not been set, the feed rate change is added to the current feed rate. In other words, if the actual power is less than the ADAPTIVE POWER, the feed rate will be increased, whereas the feed rate will be decreased if the actual power is above the ADAPTIVE POWER. The new feed rate is compared against the operator's selected MAXIMUM feed rate and MINIMUM feed rate. If the new feed rate is greater than the MAXIMUM feed rate, the controller 30 sets the feed rate to the MAXIMUM feed rate. Similarly, if the new feed rate is less than the MINIMUM feed rate, the MINIMUM feed rate overrides and is used as the new feed rate which is sent out to the machine via the feed rate override circuitry card shown in FIG. 4.

Figure 6F:
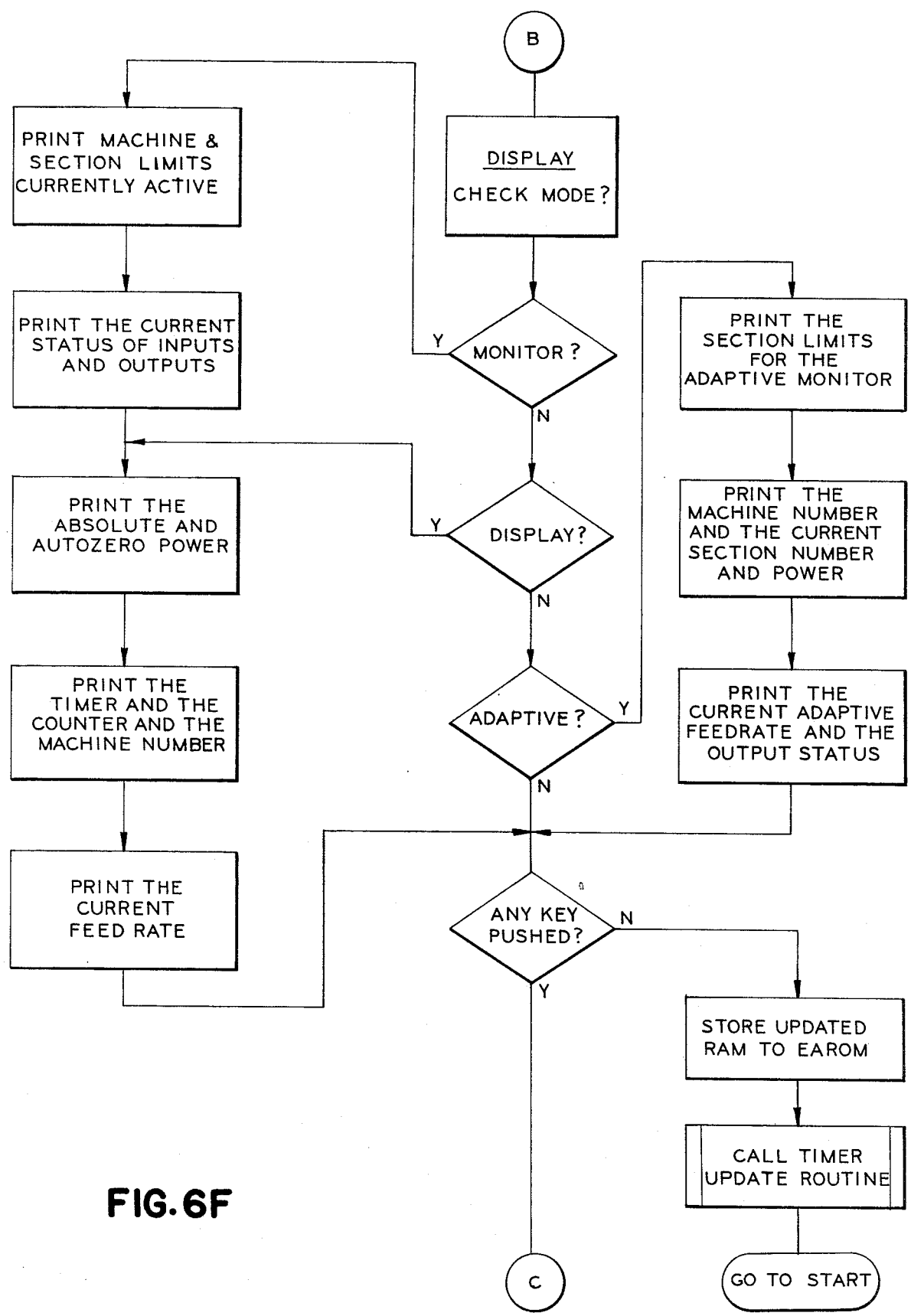
Figure 6G:
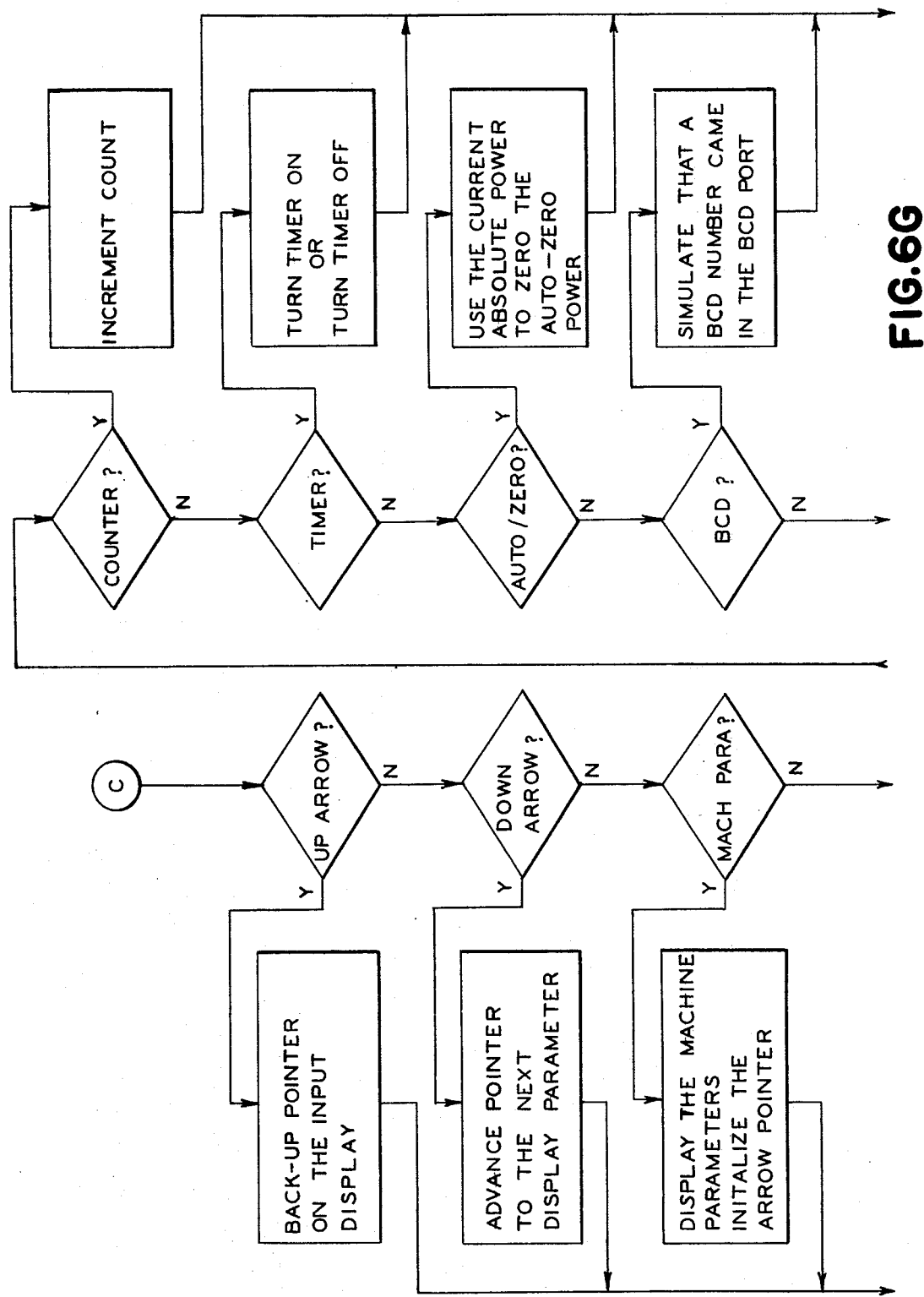
Figure 6I:
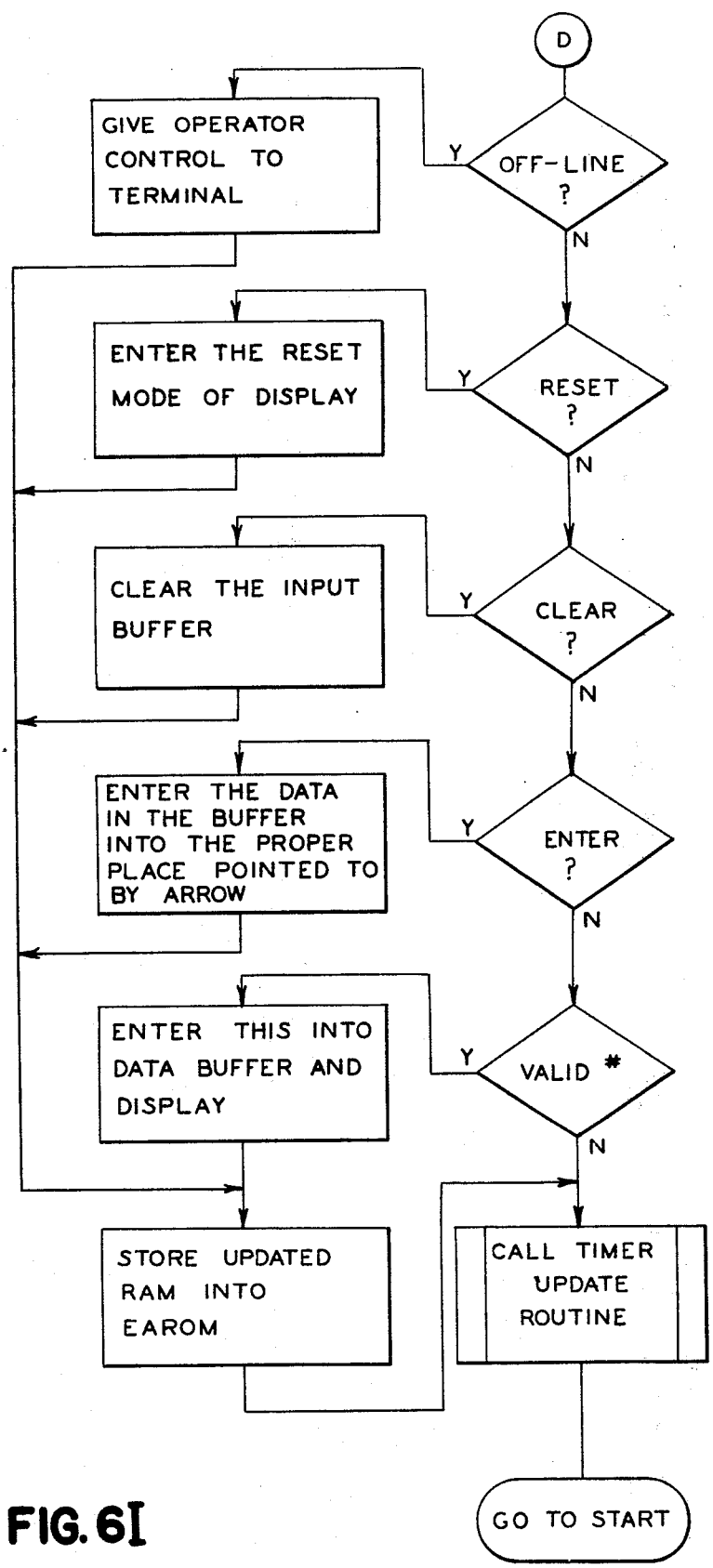

After the limit monitoring and feed rate change functions have been performed the program progresses through instructions such as those shown in FIGS. 6F-6H which monitor the keyboard inputs and perform the functional blocks therein shown. Generally, these functions relate to controlling the readout on display 34.

Figure 6J:
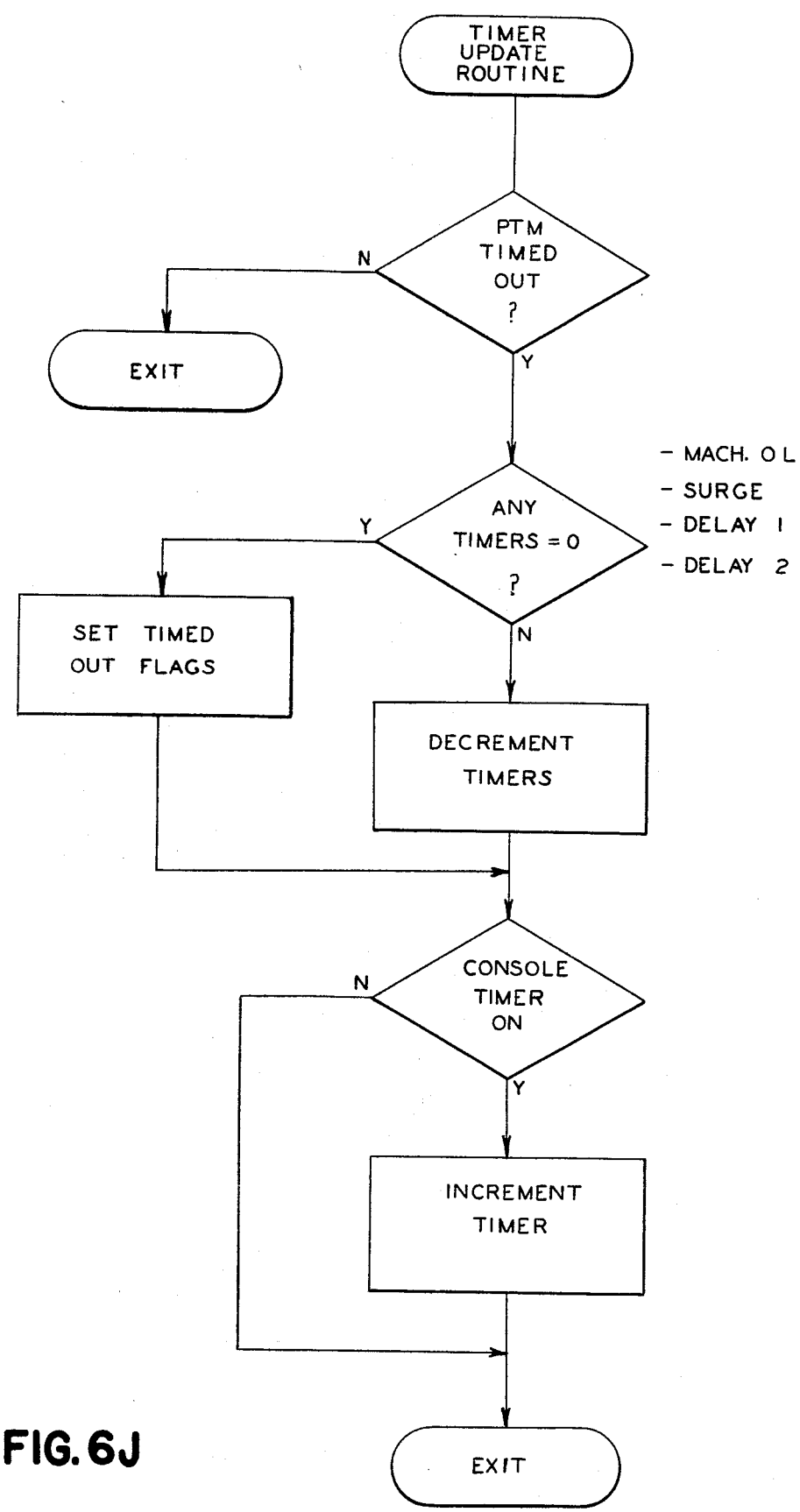

Turn now to the timer update routine shown in FIG. 6J. This routine checks the condition of the programmable timer 108. As noted above, programmable timer 108 is set to time out every tenth of a second. If it is timed out the states of the following software timers are checked: machine OVER LIMIT TIME DELAY timer, SPINDLE SURGE TIME timer, LIMIT 1 DELAY timer, and LIMIT 2 DELAY timer. If any of these timers have timed out, a flag corresponding to the particular timer is set. Those timers which have not timed out are decremented by one count. Thus, it can be seen that these timers are loaded with a predetermined count which is a function of their programmed time and then decremented at the time period determined by programmable timer 106. However, as noted earlier in connection with FIGS. 6A and 6B, these timers are continuously reinitialized or reloaded with the original count as long as their associated limits have not been exceeded. The only method by which these timers will time out is if their associated limits have been exceeded for their selected time periods.

If the machine console TIMER has been enabled by the appropriate BCD programmable parameter selection, it will be incremented to provide a visual indication of the run time for machine 10.

It can now be appreciated that the present invention provides a machine controller having extremely more flexibility than those known in the art. Providing the user with the opportunity to determine whether the output signals should be latched or nonlatched in response to an over limit condition enables the controller to be utilized for a wide variety of applications. The programmable time delays permit uninterrupted machine operation which accomodates for expected fluctuations in power levels and enables the user to individually define the constraints for his machine that will alter the machining operation. The unique mode of adaptively controlling the machine insures system stability while at the same time permitting the user to select different, but comparatively more stabilizing, response rates for different applications. The feed rate override circuitry likewise is automatically adapted to different motor ratings which may be found on different machines. In general, the controller utilizes relatively straightforward and inexpensive sensing techniques for a single machine criterion, but it optimizes the utilization of this criterion to provide a universal controller for a wide variety of machine tools.

It should be understood that the functional control aspects of this invention may be implemented by a variety of techniques. The foregoing specification has taught one skilled in the art how to use the invention by illustrating software routines which can be utilized to program a microprocessor to perform these functions. While this technique is believed to be the best mode of practicing this invention at this time, it can be performed by hardwired circuitry if desired, for example, by integrated circuit devices which contain the same basic elements which are only temporarily utilized by the microprocessor when instructed by the software program.

Therefore, while this invention has been described in connection with certain specific examples thereof, no limitation is intended thereby except as defined in the appended claims.

The embodiments of the invention in which an exclusive property or privilege is claimed are defined as follows:

1. A controller for a machine having a tool for removing material from a workpiece, said controller comprising:
sensing means for monitoring the power used by the machine;
limit setting means for supplying a first limit value defining a first extreme level of power consumption for the machine;
comparison means for comparing outputs of said sensing means and said limit setting means, operative to provide an output signal if the machine power consumption has exceeded the limit value;
first programmable timer means capable of storing a selectively alterable time period;
manually actuable means for loading said timer means with a selected time period; and
output means capable of altering the machine operation when the machine power consumption has continuously exceeded the limit value for said selected time period whereby electrical noise and expected fluctuations peculiar to the machine operation may be accommodated without disturbing the optimum machine operating conditions.

2. The controller of claim 1 wherein said limit setting means further comprises:
means for supplying a second limit value whereby to define a machine operational power window in conjunction with said first limit value for machine power consumption.

3. The system of claim 2 which further comprises:
a memory; and
means for loading said first and second limit values into selected memory locations.

4. The controller of claim 3 which further comprises:
a microprocessor, operative for fetching said first and second machine power consumption limits from the memory and comparing said limits within the machine power consumption as sensed by the sensing means.

5. The controller of claim 1 which further comprises:
a memory;
a keyboard coupled to said memory, operative to load a count signal related to the selected time period into a particular memory location.

6. The controller of claim 5 which further comprises:
means for periodically decrementing the count signal in said timer means when the machine power consumption has exceeded said limit value; and
means for periodically reinitializing the count signal in said timer means when the machine power consumption is within said limit value.

7. The controller of claim 6 which further comprises:
a microprocessor program means having a block of instructions stored in said memory for operating said microprocessor, said block of instructions being periodically executed in a cyclical fashion; and
second programmable timer means controlling the cycle time for said block of instructions.

8. The controller of claim 7 wherein said program means instructs said microprocessor to compare the machine power consumption with said limit value, reinitialize the count signal in said first timer means if said machine power conconsumption is within limit, and decrement said first timer means if the machine power consumption has exceeded said limit value; and
means for interrogating the contents of said timer means and providing a signal to said output means to alter the machine operation if said timer means has timed out.

9. The controller of claim 3 which further comprises:
a programmable surge delay timer stored in said memory, operative to disable said comparison means until a selected time period has elapsed after machine start up.

10. The controller of claim 9 which further comprises:
means for sensing power initially applied to said machine, operative to begin the timing of said programmable surge delay timer.

11. The controller of claim 1 wherein said output means includes at least one dedicated output line, and wherein said controller further comprises:
programmable means for latching or nonlatching the signal state of the output line once the machine power consumption has exceeded said limit value for the selected time period.

12. The controller of claim 11 which further comprises:
a memory;
a keyboard communicating with said memory for supplying a latch signal to the memory indicating whether the status of the dedicated output line should be latched or nonlatched once the limit value has been exceeded; and means for checking the memory for the presence of said latch signal when the machine power consumption is within said limit value to thereby determine the state of the signal provided to the dedicated output line once the machine power consumption is again within said limit value.

13. A method of adaptively controlling an automated machine having a tool for machining a workpiece, said method comprising:
storing an air cut feed rate value in a memory for determining the machine feed rate when the tool is not in contact with the workpiece;
storing an impact feed rate in a memory for determining the machine feed rate upon initial impact between the machine tool and workpiece;
storing a selected adaptive power level in a memory for determining the desired machine power consumption during normal machine operation after impact;
sensing the power consumed by the machine;
comparing said machine power consumption with a preselected limit value;
driving said machine at the air cut feed rate until the machine power consumption exceeds said limit value;
driving said machine at said impact feed rate for a predetermined amount of time to stabilize machine operation once the power consumption has exceeded the limit value; and
thereafter, driving said machine at a feed rate necessary to maintain the machine power consumption at the adaptive power level.

14. The method of claim 13 wherein said impact feed rate is slower than the air cut rate.

15. The method of claim 13 which further comprises:
loading a timer with an impact feed rate hold time representative of the time necessary to stabilize machine operation upon impact of the machine tool with the workpiece;
activating said timer when the machine power consumption exceeds the limit value; and
maintaining the feed rate at the impact feed rate until the impact feed rate hold time has elapsed.

16. The method of claim 13 which further comprises:
continuously monitoring the error difference between the actual power consumed by the machine and the adaptive power level stored in the memory; and
generating a new adjusted feed rate level until the actual power consumption is substantially equivalent to the desired adaptive power level.

17. The method of claim 16 which further comprises:
comparing the actual power consumption with the desired adaptive power level;
providing a feed rate change value as a function of the error difference therebetween;
adding the feed rate change value to the current feed rate if the actual power consumption is below the desired adaptive power level; and
subtracting the feed rate change value from the current feed rate if the actual power consumption is above the desired adaptive power level.

18. The method of claim 17 wherein said feed rate change value varies exponentially with the error difference between the actual machine power consumption and the desired adaptive power level to thereby stabilize machine operation at low error levels and provide fast recovery at high error levels.

19. The method of claim 18 wherein said feed rate change value is generated according to the formula:
FEED RATE CHANGE = $2^{(ERROR)}$
where ERROR is the difference between the actual machine power consumption and the desired adaptive power level.

20. The method of claim 19 wherein the feed rate change value is generated by a 2 step digital approximation which includes the summation of a feed rate segment value associated with a beginning point in a segment of values and a feed rate interpolative value derived from a linear interpolation to find a value within the segment associated with the ERROR.

21. The method of claim 20 wherein said feed rate segment value is calculated according to the formula:
$2^{(INT(ERROR/N))}$
where N is a positive whole number.

22. The method of claim 21 wherein the feed rate interpolative value is calculated according to the formula:

$$INT\left(\frac{(ERROR) - (INT(ERROR/N) \cdot N)}{2^{(8-INT(ERROR/N))}}\right)$$

23. The method of claim 17 wherein the current feed rate is maintained unless the error difference between the actual machine power consumption and the desired adaptive power level exceeds a predetermined value thereby defining a nonreactive window.

24. The method of claim 23 wherein said predetermined value is a function of the selected adaptive power level.

25. The method of claim 24 wherein said nonreactive window is defined by the steps of:
reading the selected adaptive power level;
generating a programmed percentage of the adaptive power level;
subtracting the generated percentage from a maximum possible value for the window to arrive at a stabilization factor; and
thereafter, adding the stabilization factor to the error whereby the nonreactive window is adjusted.

26. The method of claim 17 further comprising:
storing a response factor value in a memory by selecting appropriate operator selectable commands; and
altering the feed rate change value according to the response factor stored in the memory.

27. The method of claim 26 wherein the feed rate change value is divided by a number which is a function of the response factor value when the response of the feed rate is desired to be decreased and multiplied by a second number which is a function of the response factor value when the feed rate is desired to be increased to thereby provide an adjusted feed rate change level.

28. The method of claim 16 which further comprises:
comparing the adjusted feed rate level with a preselected maximum feed rate; and
driving said machine at said preselected maximum feed rate if the adjusted feed rate level exceeds the maximum feed rate level.

29. The method of claim 16 which further comprises:
comparing the adjusted feed rate level with a preselected minimum feed rate level; and
driving said machine at said minimum feed rate level if the adjusted feed rate level is below the minimum feed rate level.

30. In a controller for a machine having a tool for machining a workpiece, said controller having at least one dedicated output line coupled to a switch for altering the machining operation upon occurrence of an alarm signal, the improvement comprising:
   means responsive to both external manual and internal machine-generated requests to force the output line to a reset condition;
   alarm means for generating an alarm signal when a machine parameter exceeds a predetermined limit; and
   individually programmable means operative in a first programmed condition to place the output line in a switch activating state only for so long as the alarm signal persists, and operative in a second programmed condition to place the output line in the switch activating state upon occurrence of the alarm signal and until reset by the means to force, whereby an operator may selectively choose, via the individually programmable means, a latching or nonlatching switch activating state of said output line to control the machine operation.

31. The improvement of claim 30 which further comprises:
   timer means for delaying the generation of said alarm signal until a preselected time period has elapsed in which the machine parameter has continuously exceeded the limit, and means for reinitializing the timer means whenever the limit is not exceeded.

32. The improvement of claim 31 which further comprises:
   manually actuable means for selectively altering said time period.

33. In an adaptive process controller for a machine having a tool for machining a workpiece, said controller having means for continuously monitoring a machine parameter and adjusting machine operation so that said parameter is maintained at a preselected value, wherein the improvement comprises:
   comparison means for providing a signal indicative of the error difference between the actual machine parameter and the preselected machine parameter; and
   adjustment means for changing the machine feed rate as an exponential function of the error between the actual and preselected parameters wherein said machine is provided with stable, yet fast response.

34. The improvement of claim 33 wherein said adjustment means further comprises:
   means for providing a digital word as an output, the contents of said digital word representing the new adjusted feed rate;
   a digital to analog converter for providing an analog signal proportional to said contents of the digital word; and
   means for coupling the output of said converter to a machine device for adjusting the actual machine feed rate.

35. The improvement of claim 33 wherein said exponential function generates a feed rate change value according to the formula:
   FEED RATE CHANGE = $2^{(ERROR)}$
   where ERROR is the difference between the actual machine parameter and the preselected value of the machine parameter.

36. The improvement of claim 35 wherein the feed rate change value is generated by a 2 step digital approximation which includes the summation of a feed rate segment value associated with a beginning point in a segment of values and a feed rate interpolative value derived from a linear interpolation to find a value within the segment associated with the ERROR.

37. The improvement of claim 36 wherein said feed rate segment value is calculated according to the formula:
   $2^{(INT(ERROR/N))}$
   where N is a positive whole number.

38. The improvement of claim 37 wherein the feed rate interpolative value is calculated according to the formula:

$$INT\left( \frac{(ERROR) - (INT(ERROR/N) - N)}{2^{(8-INT(ERROR/N))}} \right)$$

39. In a machine controller for adaptively controlling the relative feed rate of the machine as a function of the error between a preselected value of a parameter and the actual parameter generated by the machine, the improvement comprising:
   feed rate change means for generating a feed rate change value as a function of the error;
   means defining a nonreactive window for disabling said feed rate change means when the error is below a preselected value; and
   means for adjusting the nonreactive window to adapt the controller to different machining applications thereby insuring stability.

40. The improvement of claim 39 wherein the window is adjusted automatically by the controller as a function of the preselected value of the machine parameter.

41. The improvement of claim 40 wherein the machine parameter is the power consumption of the machine.

42. In a machine controller for adaptively controlling the relative feed rate of the machine as a function of error between a preselected value of a machine parameter and the actual value of the parameter generated by the machine, the improvement comprising:
   feed rate change means for generating a feed rate change value as a function of error;
   individually programmable means for selecting a response factor for affecting the controller response to the error;
   adjustment means for adjusting the feed rate change value as a function of the response factor; and
   means for altering the machine feed rate according to the value of the adjusted feed rate change value.

43. The improvement of claim 42 wherein said adjustment means further comprises:
   means for multiplying the feed rate change value with a number which is a function of the response factor when the response is desired to be increased; and
   means for dividing the feed rate change value with a number which is a function of the response factor when the response is desired to be decreased.

44. In a machine controller for controlling the relative feed rate of a machine having a motor for effecting the feed rate between a workpiece and a tool, the improvement comprising:
   means for generating a digital output signal whose contents is a function of the desired feed rate;
   means for sensing the maximum and minimum operating voltage levels of the motor;

buffer means having a plurality of inputs for receiving said digital signal, and a plurality of outputs, operative to provide signals on its outputs at voltage levels which are a function of the contents of the digital signal and the operating voltage levels of the motor;

wherein the output signals from the buffer are automatically referenced to the operating voltage levels of the motor so that they may be utilized to control the motor at the desired feed rate.

45. The improvement of claim 44 wherein said sensing means are coupled to reference inputs in said buffer means to determine the output voltage levels therefor.

46. The improvement of claim 45 wherein said sensing means are tapped on either side of a feed rate override potentiometer biased at the maximum voltage rating for the motor.

47. The improvement of claim 46 which further comprises:

digital to analog converter means coupled to the outputs of the buffer means, operative to provide an analog output signal to the feed rate override potentiometer as a function of the buffer output signals.

48. The improvement of claim 47 wherein said digital signal includes a plurality of bits at a logical high or low voltage level; and wherein the buffer means assigns each bit at a logical high level to the maximum operating voltage level of the motor and each bit at a logical low level to the minimum operating voltage of the motor.

49. In a controller for an automated machine having the capability of performing a plurality of different machining operations, said controller having at least one dedicated output line coupled to the machine capable of altering the machining operation depending on the state of the output line, the improvement comprising:

manually selectable means for selecting section parameters associated with each machining operation, said section parameters including (a) a first limit value defining a first extreme level of machine power consumption; (b) a second limit value defining a second extreme level of machine power consumption; (c) a first timer value defining a first delay time period associated with said first limit value; (d) a second timer value defining a second delay time period associated with said second limit value; and (e) a status control selection for latching or nonlatching the state of the controller dedicated output line when overlimit conditions are detected;

manually selectable means for assigning each section with an identification tag;

memory means for storing a plurality of different sections along with their respective identification tags in a memory;

means in the machine for generating the appropriate section identification tag for each different machining operation such that the controller will utilize the identified section parameters for monitoring the particular machining operation to be performed;

means for monitoring the power consumed by the machine;

comparison means for comparing the machine power consumption with said first and second limit values, operative to change the state of the controller dedicated output line if either of said limit values have been continuously exceeded for their respective delay time periods; and means for maintaining the changed state of the dedicated controller output line regardless of subsequent sensed levels of machine power consumption if the status control selection indicates that the output line is to be latched, and otherwise returning the state of the output line to its original state when machine power consumption is again below said first and second limit values if the status control selection indicates a desired nonlatched condition.

50. The improvement of claim 49 which further comprises two controller dedicated output lines each associated with said first and second limit values, respectfully.

51. The improvement of claim 49 wherein said controller further comprises, in addition to said section limit values, manually selectable means for defining a machine operational power window having selected upper and lower limit values; a third controller output line coupled to the machine, operative to alter the machining operation if the machine power consumption violates said power window limits even though the currently utilized section first and second limit values may not have been exceeded.

52. The improvement of claim 51 which further comprises a manually selectable third time delay period associated with the machine operational power window, operative to delay the machine alteration via the third output line until the machine power consumption has continuously violated the operational power window for the third time delay period.

53. The improvement of claim 51 which further comprises manually selectable means for selectively disabling the lower limit value for a particular machining operation.

54. The improvement of claim 51 which further comprises:

a manually selectable surge delay timer stored in the memory means, operative to disable said comparison means until the selected surge time delay has elasped after machine start up.

55. The improvement of claim 54 which further comprises:

means for sensing power initially applied to the machine, operative to begin the timing of said surge delay timer.

56. The improvement of claim 49 wherein the machine is a numerically controlled machine having a BCD command bus coupled to machine components for control thereof, said machine providing said section identification tag to said controller over said BCD bus prior to initiating a particular machining operation so that the controller may utilize the appropriate section parameters for monitoring the particular machining operation.

57. The improvement of claim 56 wherein said controller further includes an adaptive control means for continuously adjusting machine feed rates to maintain machine power consumption at a manually selectable adaptive power level.

58. The improvement of claim 57 wherein said machine further comprises means for selecting adaptive control for a particular machining operation by placing a particular code on said BCD bus prior to beginning the machining operation.

* * * * *